Nov. 8, 1960
G. T. RANDOL
2,959,011
POWER-ASSISTED OPERATING MECHANISM FOR
HYDRAULIC PRESSURE SYSTEMS
Filed Nov. 21, 1955
7 Sheets-Sheet 1
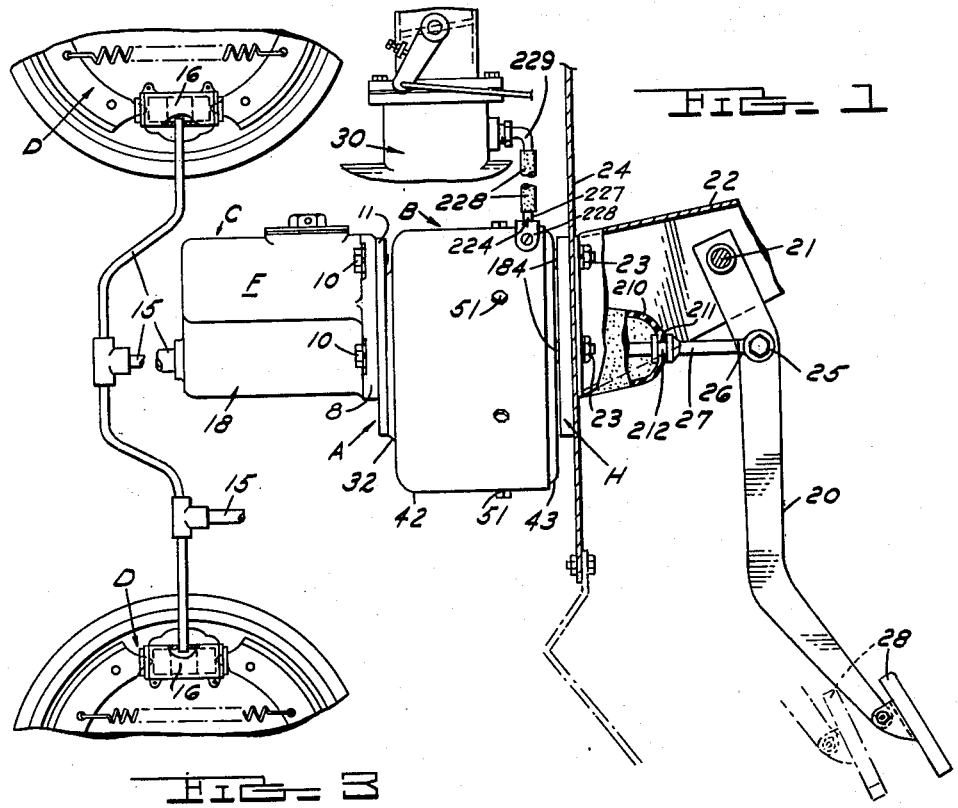
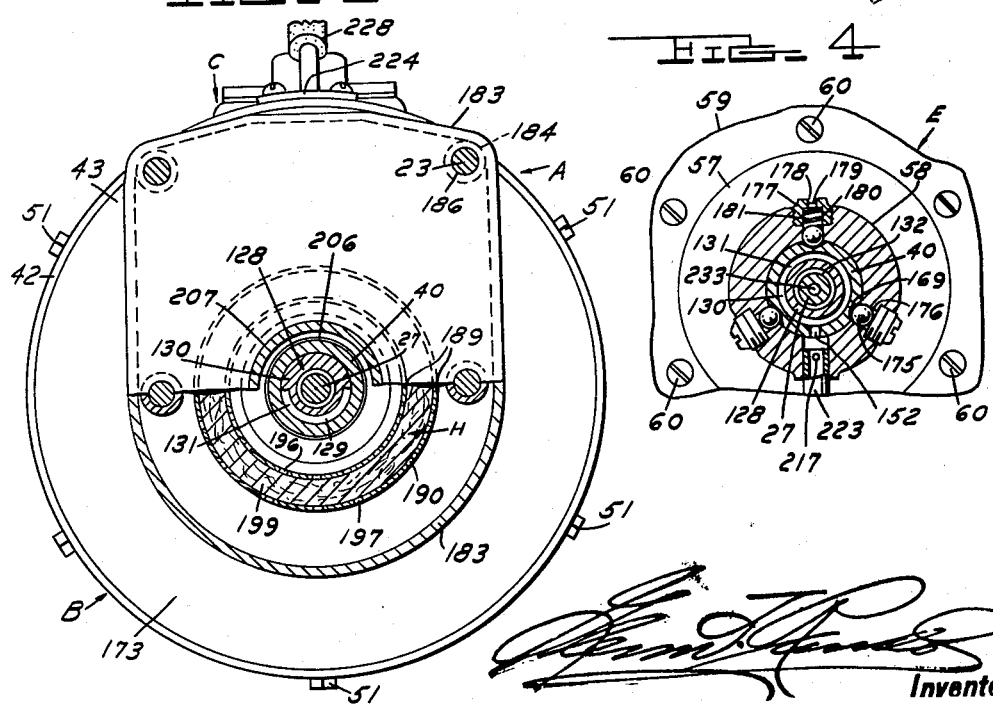
Inventor

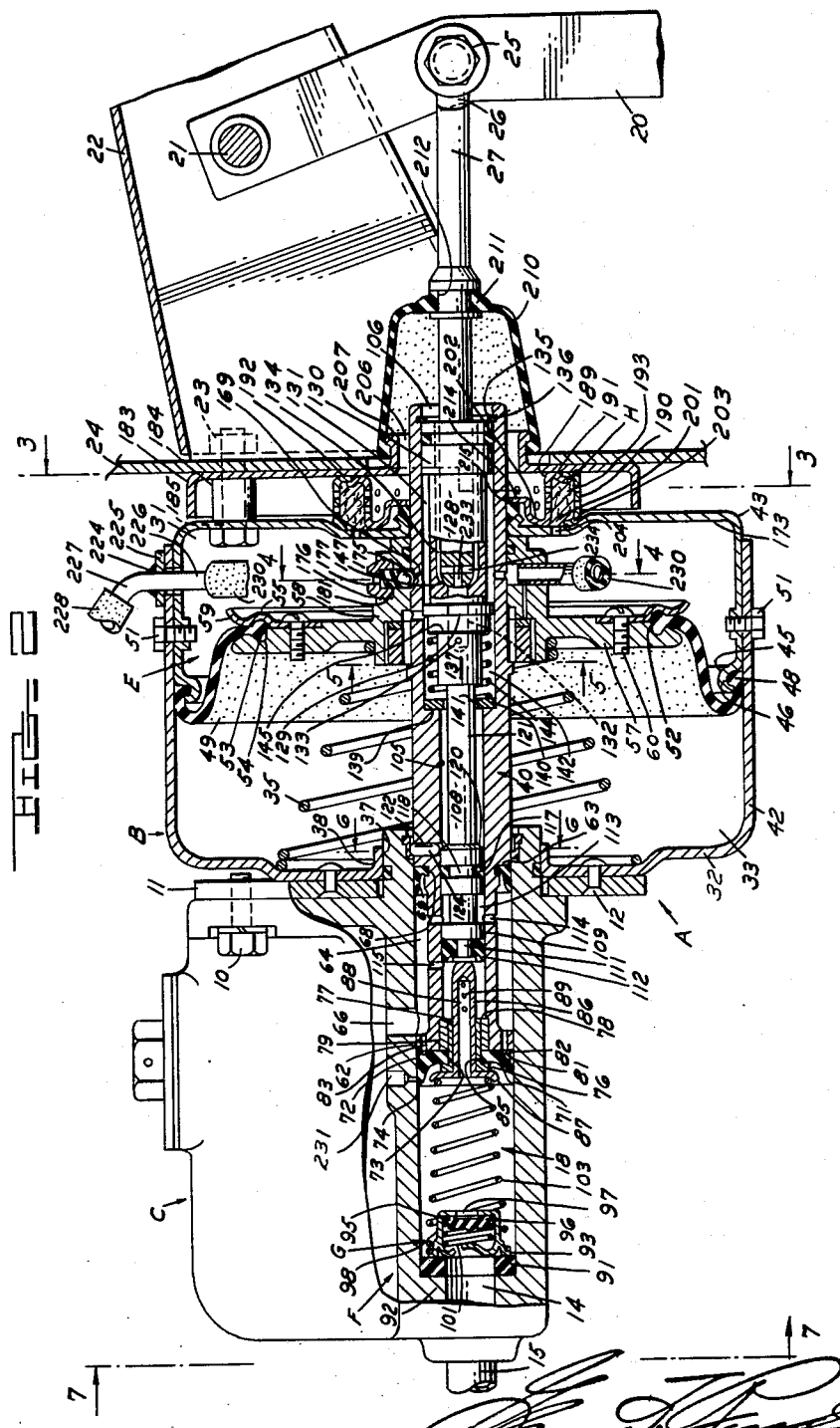

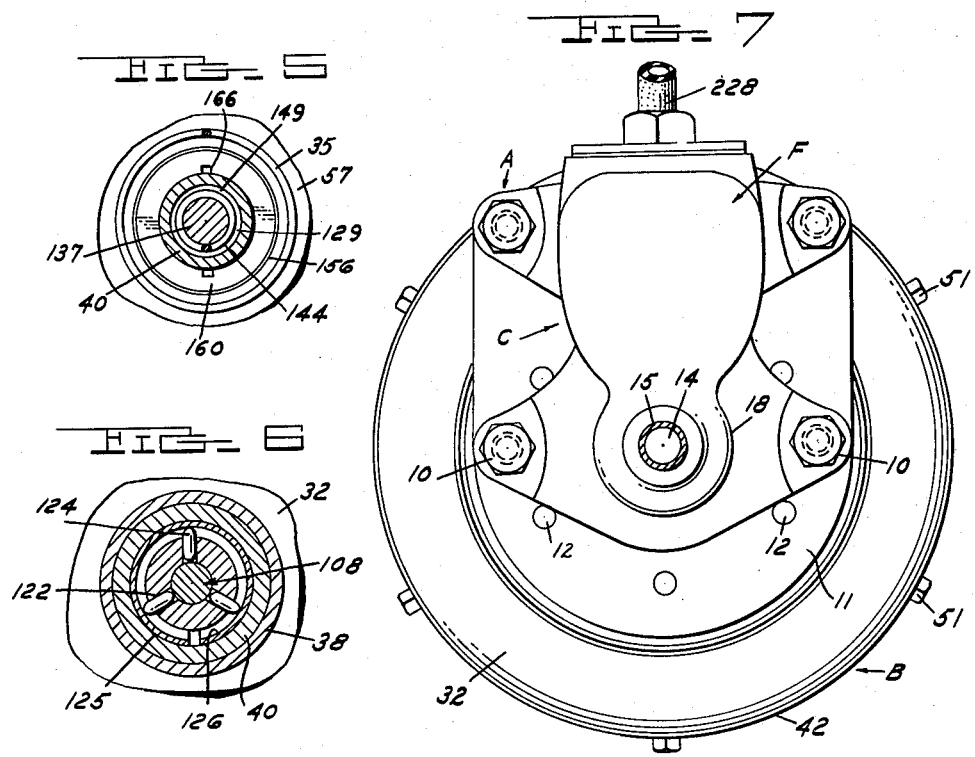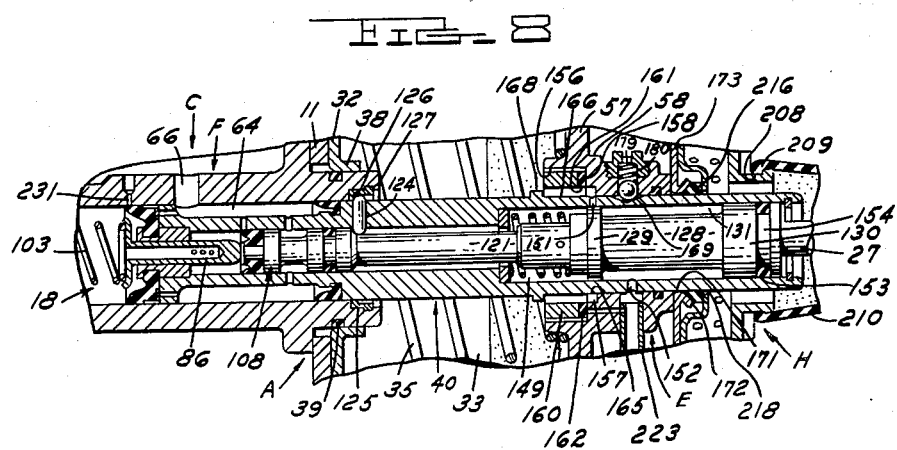

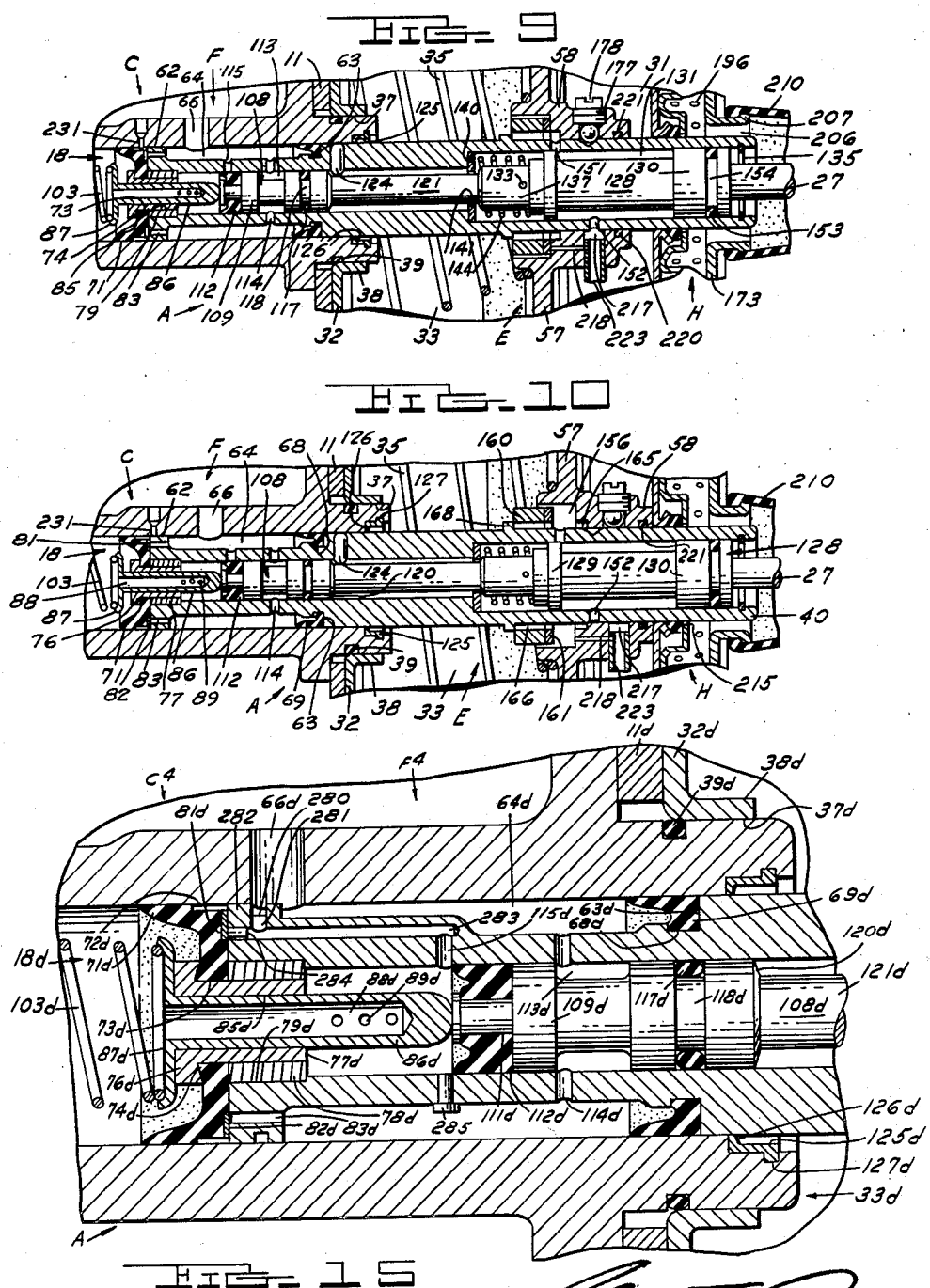

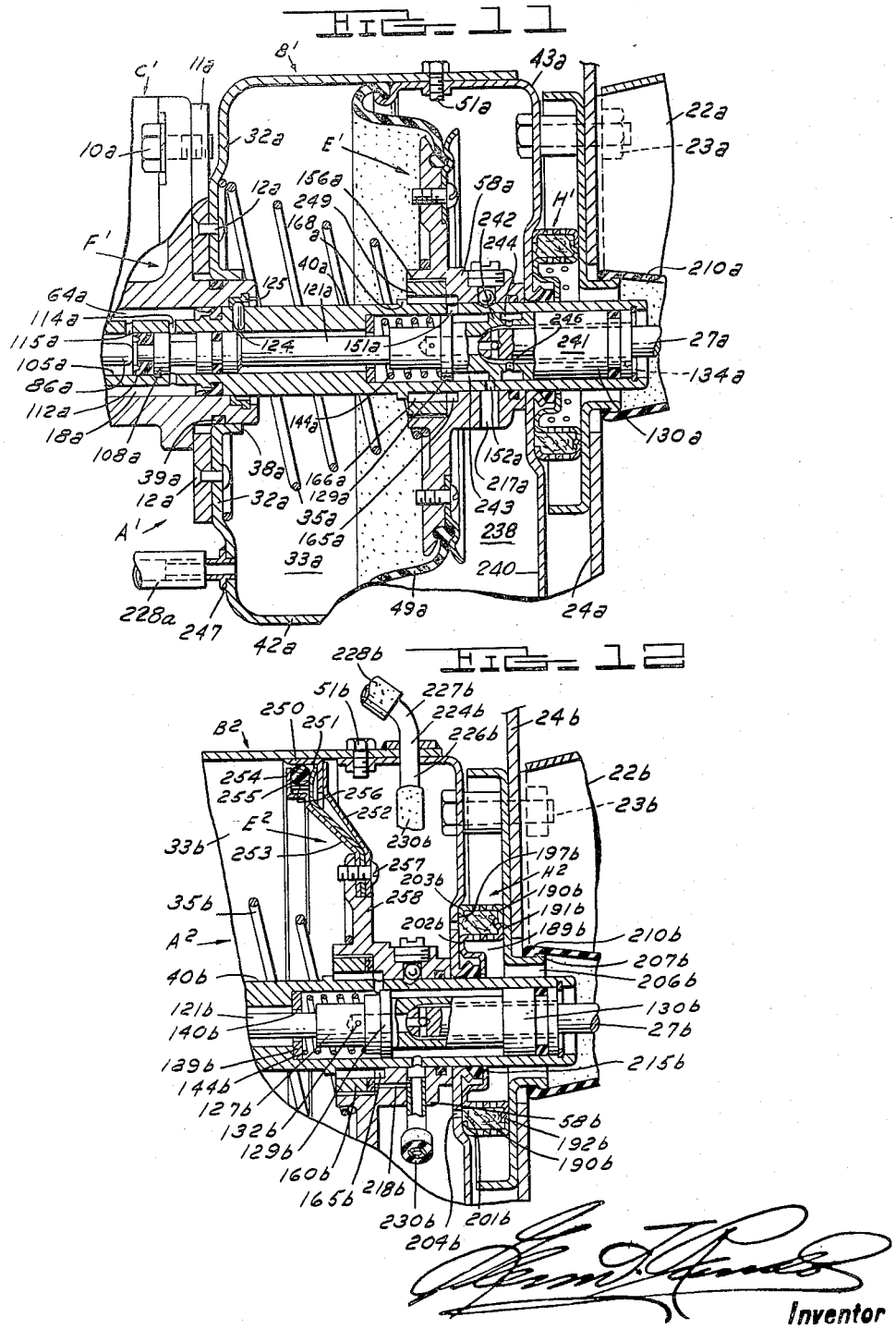

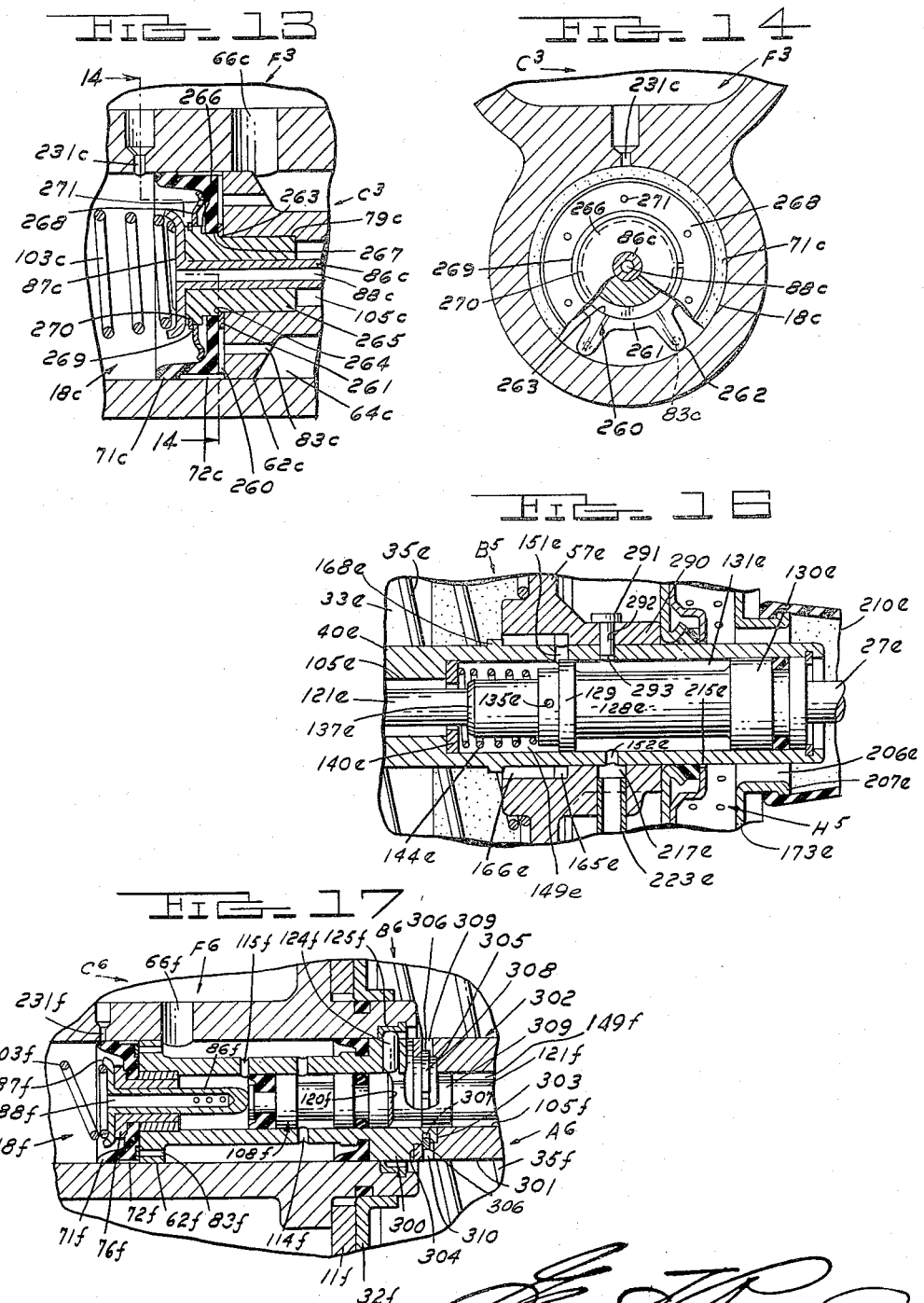

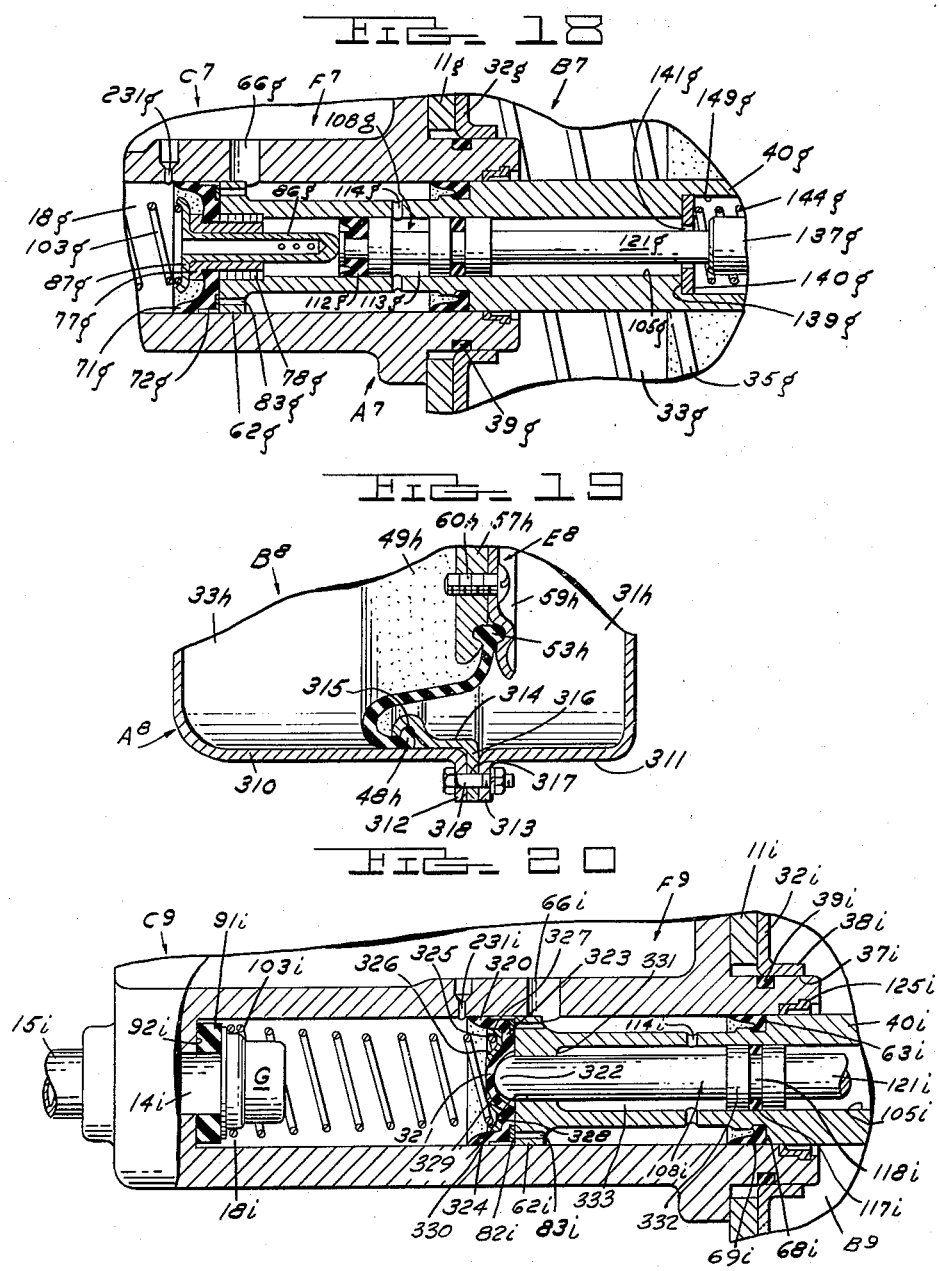

United States Patent Office 2,959,011
Patented Nov. 8, 1960

2,959,011

POWER-ASSISTED OPERATING MECHANISM FOR HYDRAULIC PRESSURE SYSTEMS

Glenn T. Randol, Mountain Lake Park, Md., assignor of fifty percent to Hamill-Markus Industries, Inc., Warren, Mich.

Filed Nov. 21, 1955, Ser. No. 547,994

10 Claims. (Cl. 60—54.6)

The present invention relates to power-assisted operating mechanism in which physical operating force is supplemented by power assistance, said mechanism including a liquid pressure producing device which is intended primarily as an actuator for hydraulic brake systems on automotive vehicles and the like, although other uses are obviously feasible, said invention constituting improvements on liquid pressure producing mechanism of the general character disclosed in U.S. Patents Nos. 2,770,949 and 2,903,855, issued to me November 20, 1956, and September 15, 1959, respectively.

Broadly, the present invention seeks to provide novel and improved power-actuated mechanism adapted to form a unitary assembly with a substantially conventional brake master cylinder, said mechanism having selectively spring-loaded control means responsive directly to an operator-operated member, such as a brake pedal, whereby conditioning of said master cylinder to pressurize the brake fluid under influence, in part, of power-actuation of said mechanism, is effected either by initial power-actuation of said mechanism following initial movement of said operator member from a normal released position or by initial operation of said operator member prior to power-actuation of said mechanism, the two aforesaid conditioning sequences being predetermined by a relatively lesser or greater spring-loaded status respectively of said control means in relation to opposition to movement of the fluid-displacing parts thereby.

More specifically, the present invention contemplates a novel hydraulic brake system of the type under consideration which is appreciably improved over similar systems heretofore proposed, from the standpoint of durability, efficiency, and predictable braking control conducive to safety under all operating conditions of the vehicle and braking control responses of the driver, and wherein the "feel" of operation is substantially normal to that sensed from conventional pedal-operated hydraulic systems.

The primary object of the invention therefore, is to provide means for attaining the ends recited in the preceding paragraphs.

Stated in more detail, it is an important object of my invention to provide novel power-operated means disposed between a hydraulic master cylinder of substantially conventional design and the associated driver-operated pedal, for controlling in part braking operations and transmitting to the driver via said pedal an awareness, or physical perception, of a portion of the total brake-applying hydraulic thrust engendered in response to incremental depressing and releasing movements of the pedal aforesaid for causing corresponding operations substantially of the power-operated means to assist in the actuation of the hydraulic master cylinder to apply and release the brakes, respectively.

The assembly referred to in the preceding paragraph incorporates a novel arrangement of the parts whereby the piston of the hydraulic master cylinder includes a coaxially disposed reactive piston of less cross-sectional area operably connected to the pedal via a control element for controlling the operating power to energize the power-operated means, said latter piston providing proportional hydraulic thrust on the pedal to the degree of total braking force effective in the hydraulic lines. The master cylinder piston assembly being of composite arrangement comprising the two coaxial pistons aforesaid, the larger of which is acted on by the movable power assembly of the power-operated means, and the smaller reactive piston is operably connected to the pedal via the control element for the power-operated means, said latter connection providing limited relative movement of the pedal, control element and piston of less cross-sectional area with respect to the piston acted on by the movable power assembly with both of said pistons operably projectable into the pressure working chamber of the master cylinder. The movable power assembly includes novel means for releasably connecting it to the larger piston, said means enabling the power assembly and connected piston to move in unison when the power-operated means is effective, and also accommodates operation of both pistons directly by the pedal independently of the power assembly to apply and release the brakes, in the event of power failure or to supplement the power when effective. With the power available, the pedal may be utilized for controlling the control element of the power-operated device to operate the brakes with minimum operator effort required, with the braking force reacting on said pedal proportionally to the hydraulic line pressure, or the brakes may be initially applied prior to the power being made available as by subsequently starting the engine, whereupon, the movable power assembly becomes energized and moves to co-operate with the pedal in applying the brakes. In the event of complete power failure, the master cylinder reverts automatically to conventional pedal control and the movable power assembly returns automatically to fully retracted or released non-interfering position during such pedal braking operation.

Therefore, a further important object of my invention is the provision of a two-sectioned hydraulic piston assembly in which each section is operable relatively to the other or in unison through the fully operating stroke thereof, the pedal being operably connected to one of the piston sections, and the movable power assembly connected to the other piston section whereby movements aforesaid of the sections are responsive to pedal operation supplemented by power when effective.

A further object importantly related to the object immediately preceding is the novel operative association of normally preloaded spring means between a conventional residual pressure check-valve and the pedal-actuated piston section for producing biasing reaction on the pedal proportional to the operating stroke of both piston sections to provide in effect a supplemental reactive force to the hydraulic pressure acting across the pedal-actuated section, said spring means being also effective through novel one-way interlocking means between said sections to return the power and piston assemblies to their normally released position wherein the brakes are "off," said interlocking means comprising a detent disposed in a radial bore in the wall of the power-actuated piston section and cooperating camming elements operably incorporated between the master cylinder body and pedal-actuated piston whereby initial pedal movement causing power operation, moves the detent out of registry with the camming element carried by the master cylinder body into confronting position with respect to the camming element carried by the pedal-actuated piston to block return movement of the latter piston during the power phase and thereby enable said spring means to act on both piston sections to bias the same toward their released positions.

A further object related to the two objects next above is the novel incorporation of helically wound normally preloaded compression spring means for continuously biasing the movable power assembly toward released position aforesaid in cooperation with the first-mentioned spring means when the power assembly is connected to the other piston section, or independently thereof when power is not available with the other piston section disconnected from the power assembly.

A further important object related to the three objects immediately above is to provide adjustable spring means in the releasable connecting means aforesaid to establish the correct thrust-transmitting characteristic thereof whereby initial depression of the brake pedal is effective to operate the said connecting means to disconnect the other or primary piston from the power assembly for movement therewith after the limited relative movement aforesaid between the pedal and piston has been taken up. Accordingly, the power assembly return spring means provide sufficient resistance to movement of the power assembly when de-energized, to enable the said connecting means aforesaid to disconnect induced by pedal operation.

A further novel feature of my invention related to the function of the spring means positioned between the residual pressure check-valve and pedal-actuated secondary piston, is the relief of the biasing effect of said spring on the movable power assembly upon initial pedal depression, whereby maximum working force of the power device is utilizable in operating the brakes rather than be dissipated in overcoming the bias of such spring means.

Another important object of the present invention is the novel arrangement of a pedal-actuated element, a residual pressure check-valve, and a compression spring normally preloaded in biasing disposition between said element and check valve whereby initial pedal actuation is effective to modulate said spring in advance of power assistance subsequently induced by said pedal, to insure effective seating of said check-valve to maintain a minimum pressure on the liquid in a hydraulic system external to a liquid pressure producing device included in such system, said spring being characterized by additionally providing simultaneous increasing resistance to pedal actuation to enable the operator to have predictable control over mergence of the power phase with pedal actuation of said device.

A further important feature is the provision of a novel air cleaner assembly formed as a spacer between the power device and mounting wall of the vehicle, said cleaner functioning to induct air free of foreign agencies tending to impair operation of the device, into the atmospheric chamber of said device in the case of an air-suspended movable power assembly, or into one of the vacuum chambers in the case of a normally vacuum-suspended power assembly.

A further object of the invention is to provide a movable power assembly of the type under consideration which is adapted for positive connection with the primary piston or plunger for movement together, or which may be releasably connected to said piston or plunger to enable independent movement of the primary and secondary pistons directly by the pedal, in the case where the power is not effective as when the engine is not running, whereby overcoming of the biasing action of the power assembly return spring, friction of the piston leather seals with the power cylinder inner wall, and resistance caused by movement of the air in and out of the power chamber are eliminated to provide normal physical effort on the pedal to apply and release the brakes in customary manner when vacuum-power, for example, is not available. Accordingly, if the brakes are applied before the engine is started, upon engine operation becoming effective the movable power assembly becomes energized and moves into co-operating position on the primary piston or plunger to assist the pedal in applying and releasing the brakes irrespective of the pedal-applied position prior to the power device becoming energized.

Another practical feature of my invention resides in a novel provision for isolating the reservoir liquid from the pressure working chamber of the hydraulic master cylinder, comprising an annular cup seal carried on the head of the secondary piston and a port between said reservoir and chamber controlled thereby, said port being normally open when the piston is in released position with the brakes fully "off," and closed to condition the chamber for pressure to be applied on the liquid therein when the piston is initially moved by pedal depression. Upon movement of the piston to close said port, and subsequent operative energization of the primary piston, the secondary piston maintains said port closed during all applied positions of both pistons whether pedal-operated or assisted by the power device, the one-way blocking means aforesaid being effective during such applied positions of the primary piston to prevent the secondary piston from opening said port after being closed as aforesaid and the primary piston operated.

Another important feature of my invention is the novel adaptation of the power cylinder to accommodate either air-suspended or vacuum-suspended normal status of the movable power member thereof.

In a more specific sense, the present invention seeks to adapt novel power-operated mechanism in combination with the standard components comprising a conventional hydraulic master cylinder, to operate said cylinder with reduced pedal effort, thereby enabling "pumping" or "feathering" control on long downgrades to prevent dangerous brake "fade," due to heat, and in the event of power failure the cylinder may be operated directly by the foot through the pedal in usual manner as is understood.

The invention consists of the novel constructions, arrangements and devices to be hereinafter described and claimed for carrying out the foregoing general statement of the nature of my invention, and such other objectives, features, and advantages as will appear in lieu of presenting them categorically in the above statement, from the following detailed description considered in conjunction with certain preferred embodiments illustrated in the accompanying drawings, wherein:

Figure 1 is a schematic view of a side elevation of my improved liquid pressure producing mechanism constructed in accordance with the present invention, and exemplarily shown connected diagrammatically to operate a hydraulic braking system of an automotive vehicle or the like;

Figure 2 is an enlarged longitudinal sectional view, partly in side elevation, of the brake operating mechanism per se shown in Figure 1 wherein the brakes are in fully released condition;

Figure 3 is a rear elevation partly in section taken along the line 3—3 of Figure 2 looking in the direction of the arrows, and showing details of the portion of the power assembly mounted on the vehicle firewall, and in which is housed the air cleaner;

Figure 4 is a transverse sectional view taken along the line 4—4 of Figure 2 looking in the direction of the arrows, and showing details of the releasable connection between the movable power assembly and primary piston including the connection to the vacuum source and associated air-vacuum passageways in the control valve element;

Figure 5 is a transverse sectional view taken along the line 5—5 of Figure 2 looking in the direction of the arrows, and showing details of the annular collar press-fitted on the primary piston and which carries the vacuum-air passageways communicating with the vacuum power chamber;

Figure 6 is a transverse sectional view taken along the line 5—5 of Figure 2 looking in the direction of the arrows, and showing details of the one-way interlock mechanism between the primary and secondary pistons;

Figure 7 is a view taken from the line 7—7 of Figure 2 looking in the direction of the arrows, and showing a front elevation of the mechanism;

Figure 8 is a fragmentary view of Figure 2 showing the operated positions of the parts with the pedal initially depressed;

Figure 9 is another fragmentary view similar to Figure 8 showing the operated positions of the parts involved with the pedal further depressed to cause power assistance in applying the brakes;

Figure 10 is a fragmentary view of Figure 2 showing the operated positions of the parts when the brakes are applied solely by physical force on the brake pedal;

Figure 11 is a modified form of the invention in which the movable power assembly is normally vacuum-suspended in released position;

Figure 12 is another modified form of the invention in which the movable power assembly comprises a piston to eliminate the flexible diaphragm power member;

Figure 13 is another modified form of the invention showing a different mounting of the flexible annular cup seal on the head end of the primary piston which includes a modified star-shaped reed valve to replace the ring valve of the Figure 1 embodiment;

Figure 14 is a transverse sectional view of the Figure 13 modification taken along the line 14—14 thereof;

Figure 15 is another modified form of the invention relating to the liquid passageway system between the master cylinder reservoir and pressure working chamber, controlled by the secondary piston;

Figure 16 is another modified form of the invention in which the releasable connection between the movable power assembly and primary piston is eliminated by securing the assembly and piston together for movement in unison;

Figure 17 illustrates a modified tubular pressure-transmitting member comprising two detachable sections;

Figure 18 illustrates another modified form of the invention for controlling the by-pass or compensating port of the hydraulic master cylinder;

Figure 19 illustrates another modified form of the invention for anchoring the peripheral marginal portion of the flexible diaphragm in air-tight sealed relation with respect to the inner cylindrical surface of a modified power cylinder; and Figure 20 illustrates a modified primary cup seal for sealing off the heads of the coaxial primary and secondary pistons from the pressure working chamber.

Referring now to the drawings, and particularly Figures 1 and 2, my improved power-assisted mechanism or device generally indicated at A comprises a power cylinder B and a hydraulic master cylinder C having an integral end flange 8 for preferaly mounting it on one end of the power cylinder as by cap bolts 10 threaded into a plate 11 secured as by rivets 12 to the cylinder end. The end of the hydraulic cylinder remote from the power cylinder has a discharge port 14 which is connected by one or more conduits 15 to one or more hydraulically actuated motors or wheel cylinders 16, which may be employed to operate automotive wheel brakes generally designated D.

The interior of the hydraulic cylinder C is formed as a pressure working chamber 18, wherein the operating pressure for the wheel cylinders 16 is developed jointly by the force exerted by a power assembly generally indicated at E movable within the power cylinder B and the force exerted by the operator on a pedal 20. The upper end of the pedal, for example, is pivotally supported at 21 on a bracket 22 secured by bolts 23 between the firewall 24 and dash panel (not shown) in the operator's compartment of the vehicle at a point below the pivot 21 the pedal is pivotally connected by means of a pin 25 to a clevis 26 formed on one end of a thrust or push rod 27 to provide, for example, a 5 to 1 leverage ratio between the thrust connection aforesaid and a foot pad 28 at the lower end of the pedal.

The power cylinder B is preferably a differential air pressure operated cylinder, utilizing either vacuum or compressed air to provide the necessary pressure differential across the movable power assembly aforesaid. In ordinary automotive installations, a vacuum-operated power cylinder is preferable to a compressed air operated power cylinder, since the conventional engine intake-manifold, such as shown fragmentarily at 30 in Figure 1, may serve as the vacuum source without affecting engine performance.

The vacuum power cylinder in the preferred illustratd embodiment of the invention (Figure 1) is atmosphere-suspended; i.e., air at atmospheric pressure is normally on both sides of the movable power assembly E which may take the form of a flexible diaphragm or solid piston, when the mechanism is in released position best demonstrated in Figure 2. Although a vacuum-suspended power cylinder herein illustrated as a modified form of the invention may be used if desired, there are certain advantages accruing from the use of an atmosphere-suspended power cylinder as, for example, chamber 31 of the power cylinder does not have to be sealed, since it is maintained under atmospheric pressure. That is to say, the angular movement of control rod 27 during the pressure stroke does not create any structural problem in the design of the power cylinder. Moreover, operation of an atmosphere-suspended power member is inherently smoother and less sensitive than the operation of a vaccum-suspended power member. On the other hand, speed of operation, which is the primary advantage of the vacuum-suspended arrangement, is not considered vital in installations where my improved power-assisted pressure producing mechanism would most likely be used as against installations in heavy-duty installations. Actually a slowed more controllable build-up of power force during initial stages of vehicular brake application is conducive to preventing sudden stops particularly those stops during low vehicular speeds as when cruising in congested traffic-light controlled intersections, etc.

The movable power assembly E, which is referred to in certain of the claims as a pressure-responsive movable wall or member, has a normal released position spaced from the inside of the end wall 32 on which the hydraulic cylinder C is mounted, to provide a control or vacuum power chamber 33 within the power cylinder B. A normally preloaded helically formed return spring 35, usually in practice of conical configuration, is operably disposed in the power chamber between the inside of the end wall 32 and confronting side of the movable power assembly E for biasing the latter toward released position.

A central annular opening 37 formed with an inturned flange 38 is provided in the end wall aforesaid, into which an annular hub portion of the master cylinder projects in air-tight sealing relationship as by the illustrated pliant O-ring seal 39 carried in the annular channel formerly utilized for anchoring the forward end of a dust excluding member such as a flexible boot, to prevent escape of vacuum from the power chamber 33. An axially bored pressure-transmitting or working member designated as a whole 40 operably projects through said hub portion in coaxial relation thereto, said member will be referred to in certain of the claims as a hydraulic piston or plunger, or a primary piston or plunger for flexibility in terminology, and is adapted to operably project in fluid-tight sealed relation into the working or pressure producing chamber 18 of the hydraulic cylinder. The power cylinder B is formed of two-cylindrical cup-shaped members 42 and 43 having wall portions of their open ends telescoped. A marginal edge portion 45 of the inner member 43 is formed with an external annular channel 46 adapted to receive an annular bead 48 on a flexible diaphragm 49 preferably made of molded rubber, said channel being effective in assembled relationship with respect to the inner cylindrical surface of the outer member 42 to slightly deform the bead under compression and thus secure the peripheral edge of the diaphragm in air-tight operating condition within the power cylinder.

A plurality of cap bolts 51 are threaded from the exterior through the overlapping cylindrical walls of the two members 42 and 43 rearwardly adjacent the channel 46 to secure the two members rigidly assembled as shown in Figure 2. The diaphragm 49 has a central opening 52 with its edge portion formed with a double annular bead 53 which is clamped between confronting annular channels 54 and 55 formed respectively in an annular end flange 57 integral with a sleeve 58 and a detachable clamping plate 59 secured to the flange 57 as by cap bolts 60, the diaphragm, flange, sleeve, and clamping plate to thus form in assembled relation the movable power assembly E.

The portion of the axially bored working member 40 projecting into the working chamber 18 comprises a spool-type assembly having an annular head land 62, an annular shoulder 63 longitudinally spaced from the head land to provide an annular liquid space 64 therebetween and which is adapted to have uninterrupted communication via an intake port 66 leading to a liquid reservoir F associated with the hydraulic master cylinder C. Adjacent the shoulder 63 is an annular groove or channel 68 for reception of an annular ring cup seal 69 preferably made of flexible rubber. The end face of the head land 62 is equipped with an annular pliant seal 71 composed of molded rubber having a plurality of circumferentially spaced flutes 72 in its peripheral lip service and a central annular opening 73 having its outer end formed as a beaded edge 74 normally subjected to slight compression by engagement of the confronting surface of an external annular flange 76 provided on the end of a sleeve 77 projecting through said central opening, said sleeve being adapted to have either limited relative sliding movement or fixed with respect to a bushing 78 press-fitted into a counterbore 79 flush with the face of the head land 62 to form the inner terminus of the tubular member 40, said seal 71 also having a circular peripheral offset portion 81 confronting the face of the head land and adapted to control liquid flow via an annular valve ring 82 carried on said offset portion and circumferentially spaced longitudinal ports 83 through the head land, from the annular space 64 into the pressure working chamber 18. The sleeve 77 has an axial bore 85 through which the stem portion 86 of an integrally flanged spring seat 87 normally engaging the flanged end of the sleeve 77 projects, the stem portion having a longitudinal bore 88 closed at its inner end and a plurality of transverse bores 89 intersecting the longitudinal bore 88 to provide liquid communication between the pressure working chamber 18 and the interior of the tubular member 40 leading from the inner ends of the bushing 78 and sleeve 77. A removable valve seat 91 encircles the discharge port 14 and is adapted to engage the end wall 92 of the pressure working chamber 18. A residual pressure check-valve assembly G having an outturned annular flange 93 movably engages the seat 91, said check-valve assembly having a self-contained pressure discharge one-way check valve 95 for enabling liquid under pressure to be displaced through the discharge port 14, and which co-operates with a seat 96 encircling an opening 97 through the end wall of the check-valve G casing 98 under the influence of a normally preloaded compression spring 101. A normally preloaded compression spring 103 of conical configuration in the preferred form is operably disposed between the spring seat 87 and flange 93 whereby its biasing action controls seating of the check-valve assembly G and return of the spring seat 87 and tubular member 40 to released position, thus said latter spring may be termed a "valve control" and "reactive" spring for novel purposes which will become apparent in the course of the description to follow.

The tubular working member 40 also includes an axial bore 105 coaxially merging with the counterbore 79 and another counterbore 106 of larger diameter leading to the outer terminus of the tubular member. A reactive piston or plunger element 108 is movably disposed in the axial bore 105 and comprises an annular head land 109 having an annular channel 111 for reception of an annular pliant ring cup seal 112, the end wall of channel 111 being engaged with the inner end of the stem portion 86. An annular liquid space 113 is provided on the element 108 rearwardly of the head land aforesaid, said space communicating at all times via a port 114 through the wall of the member 40 connecting the annular space 64 with the interior of the bore 105 and the reservoir, and another port 115 is provided through the wall of the tubular member 40 immediately ahead of the edge of the seal 112 to place the annular space 64 in communication with the pressure working chamber 18 when the apparatus A is in released position as shown in Figures 1 and 2, the reactive element 108 being adapted to close port 115 upon initial relative movement thereof with respect to the tubular member to condition the pressure working chamber to displace liquid under pressure via the discharge port 14 as will appear. An annular pliant ring seal 117 is disposed in an annular channel 118 to prevent the liquid from reaching the power chamber 33 via the longitudinal bore 105. Accordingly, the seals co-operate to confine all static liquid within the reservoir F and the two annular spaces provided therefor. An annular cam shoulder 120 is provided between the normal diameter of the reactive element and a reduced rearwardly extending stem 121, a plurality of radial bores 122 are provided through the wall of the tubular member 40 for reception of a radially movable conically ended pin 124 in each end of such length substantially equal to the thickness of the tubular member wall and depth of the cam shoulder 120. A split resilient ring 125 having an internal annular shoulder 126 and an external annular end flange 127 adapted to replace the conventional piston stop and split retainer ring respectively, said shoulder being normally disposed adjacent the left side of the outer ends of pins 124 when the mechanism A is in Figure 2 released position, and the inner ends of the pins engage the normal diameter of the reactive element 108 forwardly adjacent the cam shoulder 120 thereby locking the tubular member 40 against longitudinal movement in either direction but accommodating limited relative movement of the reactive element in either direction with respect to the tubular member 40 to release the said member for movement by the power assembly E when energized in co-operation with operator force applied on the pedal 20 or directly by the pedal in case of partial or complete failure of the power operating means B.

A slide valve element or piston 128 is disposed in the counterbore 106 of the tubular member 40 for controlling operation of the power assembly E. This valve is the spool-type and comprises two longitudinally spaced annular lands 129 and 130 providing an annular space 131 therebetween, a closed end axial bore 132 which is intersected by cross bores 133 through the wall of the valve, and a counterbore 134 merging with the bore 132 and extending to the outer terminus of the valve element. A split retainer ring 135 engages an annular groove 136 in the inner surface of the counterbore 106 adjacent the outer terminus of the tubular member 40 for engagement by the valve element 128 to establish the latter and associated parts in their normal released positions best shown in Figure 2 wherein the valve element is in "off" position. A reduced extension 137 forms the inner end of the valve element 128 through which the cross bores 133 are made, and is adapted to normally engage the confronting end of the reactive plunger stem 121 whereby the compression spring 103 is normally effective to bias the reactive plunger 108 and valve element 128 to their respective released positions as shown in Figure 2. An internal annular shoulder 139 is provided at the point of mergence between the longitudinal bore 105 and counterbore 106, said shoulder being engaged by a thrust washer 140 having a central opening 141 through which the inner end of the stem 121 operably projects into engagement with the confronting end of the reduced extension 137. A predetermined lost-motion space 142 is defined between the washer 140 and confronting end of the reduced extension 137 for limiting relative movement of the reactive piston 108 and slide valve 128 to an "on" operating position of the latter for power-activation of said power cylinder B, with respect to the tubular member 40, and a normally preloaded compression spring 144 is operably disposed between the washer and a shoulder 145 provided by the mergence of the reduced extension 137 with the inner annular working land 129 on the slide valve 128 to return the latter to its normally released closed position shown in Figure 2 in cooperation with the spring 103 or independently thereof when the reactive piston 108 is locked forwardly by the one-way blocking pins 124 while the tubular member 40 is operated best demonstrated in Figure 9 wherein the inner ends of the pins 124 are disposed in the path of the cam shoulder 120 thus holding the reactive piston 108 forwardly to maintain the port 115 closed. Under these circumstances the spring 103 is effective to bias the reactive piston 108 and tubular piston 40 simultaneously toward Figure 2 released position with the cam shoulder 120 in engagement with the inner ends of the pins 124 and their outer ends engaging the inner surface of the hydraulic pressure chamber cylinder, with the spring 144 acting independently of spring 103 to control the slide valve piston 128 toward released position. However, it should be made clear at this point that when the slide valve 128 is open causing energized movement of the power assembly E, the biasing action of both springs 103 and 144 plus the liquid pressure condition within the pressure chamber 18 acting proportionally across the end of the reactive piston, react on the slide valve 128 for an important control purpose to be elaborated on later in the course of the present description.

The merging point of the counterbore 134 with the axial bore 132 of the slide valve 128 provides an internal annular shoulder 147 against which the free end of the push rod 27 acts to enable operator force applied on the pedal 20 to actuate the valve piston and reactive plunger in opposition to the biasing force of the two springs 103 and 144 and the proportional liquid pressure condition within the working chamber 18 whereby the operator is given a reduced "feel" of the degree of total brake applying force effective at the wheel cylinders 16.

An atmospheric chamber 149 is formed in the interior of the tubular member 40 between the washer 140 and inner annular land 129 and which is connected to atmosphere via the cross bores 133, axial bore 132 and counterbore 134. A port 151 is provided in the tubular member 40 normally communicating with the atmospheric chamber 31 when the slide valve 128 is released as shown in Figure 2. This latter port is controllable by the annular valve working land 129 to selectively connect the port to vacuum and atmosphere. Another port 152 passes through the wall of the tubular member 40 for communicating at all times with the annular space 131, and an annular O-ring seal 153 is provided in an annular channel 154 in the outer valve land 130 to insure against loss of vacuum past this valve land.

The flange sleeve 57, 58 is formed with an internal annular recessed portion 156 and a reduced annular recess 157 providing an annular shoulder 158 therebetween. A thrust-receiving collar 160 is press-fitted on the outer diameter of the tubular member 40 normally in circular alignment with the recess 156. This collar has a reduced annular shouldered extension 161 on which is press-fitted an annular valve seat ring 162 preferably composed of hard rubber or suitable plastic material. The inner face 163 of this valve ring is adapted to normally engage a complemental confronting circular face 164 formed on the shoulder 158 thereby converting the reduced recess 157 into an annular channel 165 encircling the tubular member 40 in airtight sealed relationship. A pair of longitudinal passageways 166 in the collar connect the power chamber 33 and channel 165. This channel is in circular alignment with port 151 at all times, and an external flange 168 is provided on the tubular member 40 to establish the circular alignment between the channel 165 and port 151, and also to insure that the collar 160 cannot be axially displaced out of its operating position on the tubular member should the press-fit connection become inadequate. A plurality of circumferentially spaced recesses 169 are provided in the exterior surface of the tubular member 40 substantially in medially circular alignment with the sleeve portion 58 through which the outer end of the tubular member slidably projects through a bearing support opening 171 provided with an angular out-turned marginal edge 172 from the central portion of the end wall 173 of the inner cup-shaped member 43 of the power cylinder. A plurality of movable detent elements 175, preferably balls, are disposed in a corresponding number of radial threaded bores 176 through the wall of the sleeve 58 in registry with the aforesaid recesses. A threaded plug 177 provided with a cross slot 178, a central venting bore 179 and a counterbore 180, is adapted to screw into the outer ends of each of said bores 176 to close the same, and a normally preloaded compression spring 181 is disposed in each of said counterbore in engagement with each of the detent elements aforesaid to bias said elements inwardly into engagement with their cooperating recesses. As clearly depicted in Figures 2 and 8, the curved surfaces of the detent elements are adapted to engage a portion of the side walls of the recesses 169 to induce opposed tension between the sleeve 58 and tubular member 40 to effect sealing between the annular valve ring 162 and fixed valve seat 164 to insure against leakby between the annular channel 165 and power chamber 33. From the foregoing it is apparent that atmospheric communication to the power chamber 33 in normal released status portrayed in Figure 2 is established in part via longitudinal passageways 166, annular channel 165, port 151, cross bore 133, axial bore 132, and counterbore 134.

An air filter assembly generally designated H is provided between end wall 173 of the inner power cylinder member 43 and a substantially rectangular mounting member 183 preferably formed as a sheet metal dish-shaped stamping with the edge thereof held in spaced relation to the end wall 173 by spacer sleeves 184 encircling mounting bolts 23 best demonstrated in Figures 2 and 3. These mounting bolts, usually four in number, are anchored in suitable openings 185 in the end wall of the member 43 and project through corresponding openings 186 in the stamping 183 and thence through similar openings in the vehicle firewall 24 and bracket 22, which when secured together by the bolts 23 serve to mount my liquid pressure producing unit A in operating position on a motor vehicle best shown in Figure 1. The air filter assembly H comprises inner and outer metallic shells 189 and 190 of circular configuration with their vertical walls 191 and 192 respectively secured together as by welding to form an annular space 193 between said circular walls. The inner and outer circular walls are perforated as at 196 and 197 respectively, and the annular space is filled with screening material 199 such as metallic wool. A circular opening 201 is provided between vertical walls 202 and 203 which communicates with holes 204 in circular alignment therewith through the end wall 173 of the member 43 thus placing the atmospheric chamber 31 in communication with the air cleaner perforations which in turn are in constant communication with an annular space 206 obtaining between an outturned centrally disposed spaced flange 207 and the tubular member 40, said flange 207 being provided with an external channel 208 to receive an internal annular bead 209 on a dust excluding flexible boot 210, the outer end of said boot having a reduced annular bead 211 engaging an external groove 212 in the push rod 27 whereby movement of the push rod is accommodated by the boot when the pedal 20 is operated. The slide valve counterbore 134 being in constant communication with the annular space 206 thus also utilizes the air filter assembly H to prevent foreign agencies from entering the power chamber 33 via the slide valve 128 and consequent possible impairment to the valve operation. An offset vertically disposed flanged portion 214 projects inwardly from the vertical wall portion 191 of the inner air filter shell 189 and has an annular opening 215 therethrough encircling the tubular member 40 in spaced relation thereto. An annular pliant ring seal 216 is disposed between the angular lip of the outturned flange 172 on the member 40 whereby in assembly, the inner marginal face thereof adjacent the opening therethrough is adapted to place tension on the sealing ring to slightly deform the same and thus insure a sliding air-tight fit of the tubular member 40 in its bearing support 171.

The sleeve and flange 57, 58 additionally have a longitudinal passageway 218 connecting the valve 162 with a port 217 which in turn communicates with the port 152 in the tubular member 40, said passageway 218 being closed by the collar 160 when engaged with the circular face 164 and open when the tubular member 40 is moved relatively to the power assembly E, the latter operation being effective when operator force alone is utilized to operate the tubular member 40 when the power cylinder B cannot be energized due to fortuitous stoppage of the engine or, as would be the case in stopping the vehicle after coasting the same before starting the engine.

The sleeve portion 58 also carries an annular O-ring seal 220 in a corresponding internal groove 221 adjacent the terminus of the sleeve opposite the flange 57, and which encircles the tubular member 40 to prevent vacuum loss therebetween.

The port 217 is equipped with a rigid tubular fitting 223, and another rigid tubular fitting 224 having a medially attached mounting flange 225 is secured to the exterior of the cylindrical wall of the inner power cylinder member 43, with one end 226 of the fitting 224 extending into the atmospheric chamber 31 and the other end 227 projecting from the exterior of the cylinder. A flexible conduit 228 serves to connect a rigid tubular fitting 229 on the intake-manifold 30 with the outer end 227 of the fitting 224. Another section of flexible conduit 230 forming substantially a convolution is positioned within the atmospheric chamber 31 in encircling relation to the sleeve 58 and serves to connect the fitting 223 with the inner end 226 of the fitting 224 whereby the port 152 is connected to the source of vacuum enabling energization of the power chamber via passageway 218 when the tubular member 40 is separated from the movable power assembly E or via the slide valve 128 when the plunger member 40 and assembly E are normally connected together as shown in Figure 2 for conjoint movement responsive to relative sliding movements of the slide valve 128 induced by operation of the pedal 20 as is understood.

A small relief passageway shown at 231 between the liquid reservoir and pressure working chamber which is standard in all conventional hydraulic master cylinders of the type illustrated herein, is maintained closed throughout the full operating stroke of the tubular member 40 thus disabling the function of this passageway so that in field installations of my novel power-assistor A, the master cylinder installed at the factory can be used. In this way a lower cost unit to the public is provided over competitive power-brakes which require specially designed master cylinders sold with the power unit as a unitary assembly at an increase in price to the car owner and with no salvage value in the discarded master cylinder removed from the car. However, the present invention contemplates unitary assemblies of the power and master cylinders for either factory or field installation in which the relief passageway 231 would be eliminated. This passageway is effective to compensate for excessive liquid in the hydraulic system upon full release of the brakes so that such excess can be returned to the reservoir F as is well understood in the brake art. This function is taken over by the relief port 115 controlled by the reactive piston 108 in the present invention.

The free end of the valve push rod 27 has an axial passageway 233 and a cross passageway 234 intersecting the passageway 233 to accommodate free passage of air from the counterbore 134 to the valve axial bore 132. This arrangement is by way of example only, since the shoulder 147 formed by the mergence of the bores 132, 134 may be engaged by the free end of the push rod in such manner as not to obstruct free passage of air through said bores to the power chamber 33 when the brakes are being released. In this connection it is desired to point out that were the passageways 233, 234 removed from the end of the push rod 27, the brakes may be released since the pedal 20 moves faster than the withdrawal of the power member 40. This action would cause the free end of the push rod to become disengaged from the shoulder 147 at the inner end of the counterbore 134 thus enabling air to freely pass by the end of the push rod into the valve bore 132 and thence into the power chamber 33 via cross bores 133 and port 151 so that the power member E will retract toward released position shown in Figure 2. Accordingly, with the spherical end of the push rod devoid of the passageways 233, 234, when engaged with the shoulder 147 to actuate the slide valve 128 acts as a valve to close the outer end of the "valve" bore 132 thus supplementing the valve land 129 to prevent air from entering the power chamber 33 via the port 151, but when the pedal 20 is released to take the brakes "off" the end of the push rod becomes slightly spaced or disengaged from the shoulder 147 to enable air to enter the valve bore 132 whereby the power member E can return to its released position under influence of springs 103, 35 according to pedal movement. In practice, with the apparatus A in fully released position, portrayed in Figure 2, the actuating end of the push rod 27 is slightly spaced from the shoulder 147 to insure complete release of the brakes.

Therefore, the present invention contemplates push rod construction having its valve actuating end with passageways 233, 234, or devoid of these passageways whereby the end of the push rod is so formed as to co-operate with a complemental surface on the shoulder 147 for venting bore 132 to atmosphere via counterbore 134 when the rod end disengages from said shoulder.

*Operation*

The manner in which my improved pressure-producing assembly A operates is believed manifest from the foregoing description. However, in the interest of clarity a more detailed consideration will be given to the operational stages of my device as follows:

Assuming that the device A is installed on a motor vehicle as the present disclosure exemplarily demonstrates in Figure 1, to operate the hydraulic braking system commonly employed on such vehicles and the device A is in released "brake off" condition as depicted in Figures 1 and 2. With the engine running, reduced pressure (vacuum) is produced within the intake-manifold 30 which is conveyed through conduits 228 and 230 via ports 217 and 152 to the air-vacuum annular valve space 131 thus substantially evacuating the air therefrom. The device is now conditioned for power operation by depressing the pedal 20 which moves the valve element 128 and reactive piston 108 in unison against the bias of springs 103 and 144, relatively to the tubular piston 40, the latter being urged toward released position by springs 35 and 103. The operator is apprised of the degree of braking pressure being developed before and after the power phase becomes effective by the combined reactive forces produced by the effects of the two springs 103, 144 and the hydraulic pressure acting on the end of the reactive piston 108. Initial movement of the pedal 20 moves the reactive piston 108 with the valve piston 128 to close the port 115 and thus conditions the pressure working chamber 18 to displace liquid under pressure via check-valve 95 through the discharge port 14 into the wheel cylinders 16 to apply the brakes as is understood. At the same time the land 129 on the valve element 128 closes the port 151 in constant communication with the power chamber 33 via annular channel 157 and passageways 166, and the annular cam shoulder 120 is moved to the left out of registry with the inner ends of the locking pins 124 (see Figure 8). Slight additional force on the pedal "cracks" the port 151 (see Figure 9) enabling vacuum to enter the power chamber 33 and thus evacuate the same of air as is understood. This action sets up a differential pressure across opposite sides of the movable power member E causing the same to move leftward substantially proportional to the extent of movement of the pedal 20.

The foregoing operation completes what may be termed the "applied stage." With the brakes in applied condition, if the operator force on the pedal 20 is halted the movable power member E will slightly advance in the brake applying direction to produce what may be termed the "poised stage" at any applied position of the primary piston 40. This latter operated stage is brought about by a "lapped" condition of the annular land 129 with respect to the port 151 induced by aforesaid slight relative movement of the primary piston 40 with respect to the slide valve 128 in the event brake pedal movement is halted as exemplified in Figure 8 showing the relative positions of the valve land 129 and port 151. Thus the brakes may be held "on" with minimum operator effort on the pedal as a result of substantial counterbalance between the differential pressures aforesaid acting on the power member E and the existent hydraulic pressure in the hydraulic lines. If the power cylinder should fail to be effective or inadequate, the force exerted by the operator on the pedal 20 will bring the inner end of the valve extension 137 into engagement with the thrust washer 140, enabling the operator to operate the hydraulic device C with physical force alone, if necessary, to attain the required displacement of liquid into the hydraulic system. With the power phase effective, however, incremental depressing and releasing movements of the brake pedal 20 cause corresponding follow-up movements substantially of the movable power member E to apply and release the vehicle brakes in a manner replete in the brake art.

During the applying stroke of the primary piston 40, the reactive piston 108 is held forwardly to maintain the port 115 closed by the locking pins 124 disposed in the path of the cam shoulder 120, yet liquid pressure reaction on the reactive piston 108 to the valve element 128 and then to the pedal 20 via the push rod 27 is effective at all times when the valve element 128 is open causing energized movement of the power member 40 in a brake applying direction to thus provide the operator with a "feel" of the extent of braking force in effect at all stages of the operating stroke of the plunger 40. This "feel" is different and improved over that provided by prior art devices for the same purpose in that a "controlled movement" of the reacting members is provided which simulates the "feel" normally inherent with pedal-operated master cylinders of conventional design. There is no tendency for the power phase to "over-brake" at any given applied position of pedal movement which provides the highly desirable feature of smooth stops at low vehicular speeds. At high vehicular speeds dangerous "grabbing" or "locking" of the wheels is prevented thus producing smooth vehicular deceleration with reduced operator effort in accordance with the pressure applied on the brake pedal.

Further considering the reactive forces effective on the pedal 20 during the aforesaid brake-applying operation, it is important to observe that the magnitude of the reduced hydraulic reaction exerted on the pedal by the pressurized brake fluid via the head end of the reactive piston 108 can be varied in accordance with the diameter of such element. However, this reduced reactive force will always be proportional to the force with which the brake shoes are frictionally applied to the vehicle brake drums, to provide the operator with accurate sensing of the amount of braking force being applied. This hydraulic reactive principle is in sharp contrast to the control characteristics provided by the spring 103 against which the control valve piston 128 is adjusted to control energization of the vacuum motor B since resistance to depression of the pedal 20 increases in direct proportion to the distance it is depressed rather than pressure conditions to which the piston 108 is subjected. While this spring reaction is of limited magnitude due to spring 103 also serving to control the residual pressure valve G, it is noteworthy that such reaction increases above the normal preloaded status of this spring as exemplified in Figure 2 in direct proportion to the distance the brake-pedal 20 is depressed from its normal solid line position shown in Figure 1. Therefore, such spring resistance alone would not necessarily have a magnitude correlated with the amount of braking force in effect at every position of the brake pedal.

As this spring is additionally compressed as shown in Figures 9 and 10 above its normal preloaded status which is limited by virtue of utilizing it to also control the residual pressure valve G, the latter serving to establish a minimum hydraulic line pressure of approximately 8–12 p.s.i. when the brakes are "off," it does provide increasing resistance in relation to pedal movement up to the point of the brake fluid becoming initially pressurized under influence of the energized motor B and operator effort exerted on the piston 108 supplemented by the thrust-transmitting capacity of spring 144 while under operating compression (see Figure 9), and thereafter, resistance becomes substantially constant as a consequence of the substantially stationary condition of the fluid-displacing parts (tubular member 40 and reactive piston 108) resulting from the non-compressible nature of the column of brake fluid. Accordingly, the reactive forces from the spring 103 and piston 108 are teamed together with the piston supplying the major portion of these two diminutive reactions as a measure of the amount of braking force in effect at any given position of the pedal 20 at which the fluid is pressurized along its full operating stroke while the spring reactive force becomes substantially constant at the point the fluid reaches a pressurized state. Spring 103 also combines with the valve spring 144 and the power diaphragm return spring 35, to return the valve parts and power diaphragm E to their respective released positions shown in Figures 1 and 2, yet spring 103 does not hinder movement of the motor diaphragm E in a pressure-producing direction since this spring is operated ahead of the tubular member 40 while the motor B is energized.

That portion of the primary piston operably projecting into the hydraulic pressure working chamber 18 being substantially conventional in construction and operation, enables the operator to "pump" the brakes to prevent dangerous brake "fade" whether the power phase is effective or not. Thus on long downgrades the operation of the brakes may be carried out in co-operation with the power phase or independently thereof in the usual manner by "pumping" the pedal to introduce more liquid from the reservoir into the hydraulic system via the ports 83 controlled by the valve ring 82 and thence past the lip of the seal 71 via the peripheral surface facilitated by the flutes 72 communicating with the valve ring 82, as needed. During brake applying movements of the primary piston 40, the pressure developed on the cup seal 71 is transmitted to the valve ring 82 to firmly seat said ring on the peripheral face of the head land 62 to thus close the ports 83 preventing escape of the liquid while under pressure back into the reservoir F.

When pressure on the pedal 20 is removed, spring 144 alone moves the valve member 128 back to the position in which the power chamber 33 is in communication with the atmosphere. As air enters the chamber 33 via the air filter H, counterbore 134, bores 233, 234 in the free end of the push rod 27, axial bore 132, cross bores 133 and port 151, the pressure differential is reduced, and eventually dissipated, enabling springs 35 and 103 to return the primary piston 40 and coaxially disposed secondary piston 108 to their respective released positions as portrayed in Figures 1 and 2. As previously pointed out, the spring 144 acts alone to return the slide valve element 128 to released closed position after a brake applying operation has been made. Spring 103 is effective under these circumstances to return the secondary piston 108 and primary piston 40 locked thereto by the pins 124 to released position supplemented by the action of the return spring 35. However, upon the coaxial pistons aforesaid reaching substantially released position wherein the outer ends of the pins 124 begin registering with the arcuate annular groove 126, the spring 103 imparts relative movement to the secondary piston 108 with respect to the primary piston 40 accommodated by the cam shoulder 120 forcing the pins 124 radially outwardly into the aforesaid channel 126 to clear said shoulder, while at this point, the return spring 35 continues effective to bias the primary piston 40 and connected power assembly E into released position which, when established, enables the secondary piston 108 to assume its fully released position thus re-establishing the lost-motion movement with respect to the inner end of the valve member 128 and locking the primary piston 40 therein in readiness for another brake operating cycle. From the foregoing it is clear that the interlocking pins 124 serve important control purposes in the present brake operating device A by maintaining the secondary piston 108 forward following initial operation thereof to condition the hydraulic cylinder C to displace liquid therefrom under pressure into the wheel cylinders 16 for the purpose, and thus prevent damage to the lip of the head seal carried by the secondary piston during control of the power brake applying phase were this seal utilized to open and close the port 115 under high hydraulic pressure conditions within the system, yet during power applying operations the combined reaction effect produced by the springs 103 and 144 and hydraulic pressures within the chamber 18 is transmitted via the reactive piston 108, slide valve 128, push rod 27 to the pedal 20 to give the operator an awareness of the total effective braking pressure being utilized for a given brake application. During the slight movement of the pedal 20 for accommodating retraction of the slide valve 128 by the action of the spring 144 independently of the spring 103, the action of the spring 144 on the pedal provides the operator with sufficient reaction since during such movements the valve 128 is introducing air into the power chamber 33 to take the brakes "off" as the pedal pressure is removed. Accordingly, the higher reactive pressures aforesaid on the pedal required during brake applying operations to properly control the power phase would serve no advantage during brake release.

During the return stroke, a predetermined pressure is retained in the hydraulic lines by means of the conventional residual pressure check-valve G. If the pressure in chamber 18 falls below atmospheric pressure during the return stroke, liquid is drawn through ports 83 from the reservoir F past the ring valve 82 via flutes 72 across the seal lip into the chamber 18 to maintain said chamber filled. When the brakes are fully "off" or released as shown in Figures 1 and 2, the residual check-valve G influenced to seat by the spring 103 will establish the minimum residual pressure in the hydraulic lines, such as, for example 5 to 10 p.s.i. and with port 115 open excess liquid in the system returns through said port to the reservoir and vice versa if additional liquid is required to fill the system. Therefore, the port 115 may be termed a compensating port.

If the power phase is disabled for any reason, sufficient pressure on the pedal 20 causes the coaxial piston assembly 40, 108 and collar 160 to separate from the power assembly E whereby the master cylinder C is operated by physical force alone in the well known conventional manner, with increased operator effort being required as is understood. This novel separating feature removes the force of the return spring 35 from the pedal action, and in the case of a piston-type power assembly, friction between the leather seal and inner surface of the power cylinder offers no resistance to pedal movement, also where the power piston or diaphragm is not detachable from the primary piston 40 requiring that such power member be moved by operator force on the pedal 20, the resistance caused by working the air via the valve element 128 into and out of the power chamber 33 is also eliminated. Thus, my improved brake operating mechanism A may be operated in usual pedal fashion with no additional force required over that normally employed in operating a conventional hydraulic braking system devoid of power assistance.

My improved device A is designed primarily for use in brake-actuating installations, such as found on motor vehicles, which are operated by a suspended-type pedal or treadle, rather than the conventional brake pedal extending through the floor of the driver's compartment. Use of the pendant-type of pedal as the brake control member simplifies control of the brakes since the device A can be readily installed in the engine compartment on the firewall for accessibility and at the same time enables movement of the pedal pad 28 which the operator's foot engages in accordance with the mechanical advantage desired. That is to say, if a shortened travel is desired, connection of the push rod 27 is established closer to the pedal pad, while if a longer travel with increased mechanical advantage is desired, the connection aforesaid would be set closer to the pivot point 21 of the pedal. Where the travel of the pedal is shortened, greater reliance on the power operating phase must be made since the pedal pad is substantially in alignment with the normal released position of the adjacent accelerator pedal with consequent loss of mechanical advantage should the power phase become disabled for any reason while operating the brakes, or in applying the brakes before the engine is started to enable energization of the power cylinder B. The low-pedal pad mounting aforesaid removes some of the time lag incident to the operator transferring his foot from accelerator to brake pedal and vice versa, and therefore, under certain driving conditions safety in control of the vehicle may be enhanced. However, actual experience in driving a car equipped with my novel pressure-producing mechanism, dictates that the longer pedal travel is conducive to better power-braking control through the full vehicular speed range, and added safety is provided should the power phase fail by having the increased mechanical leverage advantage instantly available to operate the brakes in usual pedal fashion without interference from the disabled power device B. Furthermore, it is difficult to provide "feel control" in a brake operating device of the type under consideration without definite pedal movement, rather than a sensitive pedal travel which tends to cause sudden and erratic operations of the power device because the operator is deprived of a definite resisted movement of pedal control prior to the power becoming effective. It is this latter serious disadvantage common in prior art devices that my improved brake operating device basically seeks to overcome by providing sufficient movement of the pedal in bringing in the power phase that sudden stops are avoided, the operator being able to blend the pedal action with the power phase to produce smooth brake applications under all driving conditions of the vehicle irrespective of the mode of pedal manipulation.

The aforesaid important advantage is provided in the present invention through the novel combination of a conventional hydraulic master cylinder associated with a new and novel power device directly controllable by an operator-operated pedal. While the prior art is replete with power-operated master cylinders of conventional or modified construction which utilize, for example, vacuum or compressed air actuation controllable by either manually or foot-operated valving remote from the master cylinder, the present invention places the pedal in novel direct mechanical relation to the parts adapted to control the action of the power device resulting in pedal control of the power phase simulating the normal "feel" when the master cylinder is operated solely by the pedal but with reduced operator effort being required.

A brief review of the operation of a conventional hydraulic master cylinder is believed apropos and is set forth below:

The master cylinder performs four essential functions, namely:

(1) Displaces liquid into the system, thus actuating the brake shoes into contact with the wheel drums.

(2) Develops the liquid pressure necessary for braking, when all shoes are in drum contact.

(3) Compensates for temperature changes or liquid seepage, thus maintaining the correct volume of liquid in the system.

(4) Charges the system with liquid upon each release of the brakes.

The reservoir F and pressure working cylinder 18 are joined by intake and by-pass ports. A passage in the reservoir filler cap vents the liquid supply to atmosphere. The intake port is connected via passages in the head land of the piston to the pressure working chamber, said passages being conventionally controlled by a star-shaped reed valve, one leg for each passage, disposed between the primary cup seal and piston head face.

With the brakes "off," the piston is fully retracted as in Figure 1, the residual pressure check-valve at the outlet or discharge port of the pressure cylinder is closed, and the by-pass port and cylinder intake port, connecting the cylinder with liquid supply, are open to enable liquid passage through the by-pass port to compensate the system for changes in liquid volume; i.e., expansion or contraction due to temperature changes or leakage.

When the brakes are "applied," the pedal is depressed to force the piston and primary cup toward the outlet end of the pressure working cylinder. Initial movement of piston and cup instantly forces liquid through the discharge port since the by-pass port was closed when the pedal was initially depressed. With the by-pass port sealed off the pressure working stroke begins. Pressure acting on the cup lip assists the cup to seal against a pressure leak past the piston. Pressure opens the residual pressure check-valve through which liquid is displaced into the hydraulic system and, after brake shoes contact their respective wheel drums, hydraulic pressures develop in accordance with the degree of braking effect desired.

During brake "release," the pedal returns to "off" position along with the piston influenced by return spring action both in the master cylinder and wheel cylinders. Returning liquid raises the entire residual check-valve from its seat, flowing around the valve to enter the pressure working cylinder. As the piston returns faster that this liquid can flow, a temporary vacuum is created in the pressure cylinder. This vacuum condition causes reserve liquid to enter the pressure cylinder through the intake port and passages in the piston head face and thence past the relaxed reed valve into the peripheral flutes on the lip portion of the seal. This additional liquid movement collapses the primary cup lip, flowing around it to help reduce the vacuum and supercharge the sealed system. As liquid continues to return from the wheel cylinders, the surplus returns to the reservoir through the open by-pass port. Where the cylinder has an open end, a secondary cup on the piston rear bearing surface prevents leaks from the reservoir.

The residual pressure check-valve has two functions, namely:

(1) To maintain 6–12 p.s.i. hydraulic pressure in the system while the brakes are released, thus lessening the possibility of atmospheric leakage.

(2) To assist "bleeding" gases from the system by preventing the entrance of air during the bleeding operation.

The present invention contemplates that the residual pressure check-valve may be located in the power unit, or conventionally at the outlet end of the pressure working chamber or in a branch thereof.

Modified power cylinder and operation

In the modified embodiment depicted in Figure 11, wherein parts analogous to those already described are designated by like reference characters distinguished, however, by the addition of the letter "a" to each numeral and the exponent "1" to each letter, only closely associated structure of the brake system is shown, and it may be assumed that otherwise the components correspond to those of the embodiment first disclosed (Figures 1–10).

The power cylinder $B^1$ is provided with two vacuum chambers 33a and 238, the latter chamber being sealed from the atmosphere by end wall 240 of member 43a devoid of the air holes 204.

An air-vacuum control valve 241 is provided with longitudinally spaced annular lands 129a, 242 and 130a forming annular spaces 243 and 244 therebetween. Passageway 217a is provided in the sleeve member 58a by removal of the tube 223 and which continuously communicates with the chamber 238. The land 129a being at all times disposed to the left of port 151a so that the vacuum condition within chamber 33a is constantly connected to the annular space 243 which in turn is normally connected to the port 152a with the parts in released position as shown in this view, thereby evacuating both chambers of air. The land 242 is operatively associated with the port 152a to selectively control the same for admission of air and vacuum therethrough to the chamber 238. Annular passageway 244 is disposed between the land 242 and annular land 130a longitudinally spaced therefrom. A radial port 246 is provided in the valve element 241 for establishing constant communication between the annular passageway 244 and counterbore 134a.

The source of vaccum 30 is connected directly to the interior of the chamber 33a by means of a rigid tubular fitting 247 secured to the power cylinder end wall 32a and a flexible air hose 228a, connected to the rigid tubular fitting 229a attached to the intake-manifold 30. A collar 249 is provided devoid of the valve function described in connection with the first embodiment to form the annular channel 165a. This collar replaces collar 160 since shoulder 161 and valve seat ring 162 are not required in this modification.

In operation, this modified structure is controlled by the already described pedal movements to slide the valve element 241 relatively to the primary tubular piston 40a, the initial movement of the valve moves the valve land 242 to a position in which the annular vacuum space 243 is isolated from the port 152a and connects the chamber 238 with the annular passageway 244 thereby admitting air into chamber 238 via counterbore 134a causing a pressure differential to be set up across opposite sides of the movable power member "E¹" since the chamber 33a is constantly subjected to vacuum. Accordingly, as the pressure rises in chamber 238, the power member moves leftward to actuate the tubular member 40a to displace liquid under pressure from the working chamber 18 through discharge port 14 into the hydraulic lines and thence into the hydraulic motors 16 to operate the same for the purpose intended. Otherwise, the operation of this modified mechanism is identical to that of the first disclosure, and therefore, further description is deemed unnecessary.

*Modified movable power assembly and operation*

In the modification shown in Figure 12 parts analogous to those already described are designated by like reference characters distinguished, however, by the addition of the letter "b" to each numeral and the exponent "2" to each letter, and the arrangement is essentially similar to that of the two previously described embodiments, except that a piston-type movable power assembly E² is employed in lieu of the flexible diaphragm, said assembly comprising an annular sealing member 250 of L-shaped cross section with the annular radial leg impinged between peripheral face portions of a pair of confronting clamping plates 251 and 252, and an inner disposed plate 253 having a peripheral annular flange 254 adapted to receive an annular oil wick 255 radially biased into contact with the other leg of the sealing member by an annular type-wave leaf spring 256. The clamping members having central openings with their marginal portions secured as by the illustrated cap screws 257 to form a unitary assembly with a flange 258, threaded into corresponding circumferentially spaced holes in the medial portion of the latter.

In operation, this modified power assembly functions in the same manner as the flexible diaphragm previously described to actuate the primary tubular piston 40b to displace liquid under pressure from the working chamber 18 through the discharge port 14b into the wheel cylinders 16 for the purpose intended.

*Modified primary piston head seal and operation*

Figures 13 and 14 show a modified form of the invention in which corresponding parts are designated by like reference characters distinguished, however, by the addition of the letter "c" to each numeral and the exponent "3" to each letter. In this modified embodiment a star-shaped reed valve element 260 is employed in lieu of the ring valve 82 of the Figure 1 embodiment, to control the ports 83c, said valve element having an inner annular web segment 261 integral with a plurality of radial legs 262, one for each of the ports 83c. This web portion has a central opening 263, the marginal edge of this opening being impinged between the face of an external annular shoulder 264 formed on a bushing 265 pressfitted into counterbore 79c, and the marginal confronting face portion on the head of the primary piston land 62c. An end annular flange 266 is provided on the exterior of bushing 265 and so spaced from the face of the head land 62c as to provide an annular channel 267 for the reception of the marginal portion of the central opening of the annular cup seal 71c. The reed valve is mounted in close adjacency to the seal and confronting face on the head land 62c, and the opposite side of the seal is stabilized against the head land by an annular flange member 268 secured in position by a split retainer ring 269 engaging an annular groove 270 in the periphery of the end flange 266, said flange member 268 being provided with a series of holes 271 therethrough to accommodate free flow of liquid between opposite sides thereof.

In operation, this modified valve and sealing member assembly performs the same functions already described in connection with the ring valve 82, and therefore, additional comment is believed unnecessary as reference may be had to the first embodiment to clarify the operation of the present modification.

*Modified liquid passageway system from reservoir and operation*

This modification depicted in Figure 15 in which parts analogous to those previously used are designated by like reference characters distinguished, however, by the addition of the letter "d" to each numeral and the exponent "4" to each letter, and is adapted to convey the liquid from the reservoir F⁴ via intake port 66d to an annular passageway 280 connected to a radial passageway 281 formed in the hydraulic piston head land 282 on the tubular pressure producing member 40d, the latter passageway intersecting a longitudinal blind passageway 283 which leads to blind port 115d controlled by the secondary piston 108d in the same manner desrcibed in connection with the Figure 1 embodiment. A plug 184 is preferably utilized to close the open forward end of the drilled passageway 283 adjacent the back of the flexible cup seal, and another plug 285 is employed to close the drilled hole through the wall of the tubular member 40d required in drilling the blind part 115d opposite thereto. It should be noted, however, that the plug 284 may be omitted since closure of the annular passageway 280 prevents escape of liquid under pressure back to the reservoir, responsive to initial projection of the tubular member 40d into the working chamber 18d.

This modified control of the liquid between the reservoir and working chamber 18d provides for elimination of the one-way interlock mechanism comprising split ring 125, pins 124 and cam shoulder 120, since the annular passageway 280 is at all times isolated from the port 66d when the primary piston 40d is operated from its released position to displace liquid under pressure from the chamber 18d. Also relief port 231 is dispensed with since the passageway 280 takes over its function.

*Modified movable power assembly and operation*

This modification shown in Figure 16 is also designated by like reference characters previously used to identify corresponding parts distinguished, however, by the addition of the letter "e" to each numeral and the exponent 5 to each letter, and provides for the elimination of the releasable connection 169, 175 depicted in Figure 1 embodiment, by fixing the power member sleeve 290 directly to the tubular piston member 40e, as by headed pin 291 pressfitted into aligned openings 292 and 293, for movement therewith at all times. This arrangement also provides for the elimination of the collar 160 and associated elements together with the longitudinal passageway 218.

In operation, the power assembly E⁵ moves in unison at all times with the tubular member 40e whether this member is operated by power and/or physical force, such being found commercially practicable where diaphragm-type of power assembly is employed since only the bias of the return spring 35e must be overcome, but in the case of the piston-type power assembly, added friction between piston and inner surface of the power cylinder, particularly in cold weather operation, builds up against pedal effort, and thus the novel separating feature hereinbefore fully described is used to provide lighter pedal movement where the power phase is disabled.

*Modified tubular pressure-transmitting member*

This modification depicted in Figure 17 is also designated by like reference characters to those previously used, distinguished, however, by the addition of the letter "f" to each numeral and the exponent "6" to each letter. The tubular member 40 of the first embodiment is divided into two sections 300 and 301 to produce a tubular member generally designated 302. A reduced portion 303 is provided on the end of section 300, said portion forming at the point of mergence with the normal diameter of the section 300 a shoulder 304, the end of the reduced portion being adapted to engage an indented shoulder 305 on the end of section 301, and the shoulder 304 being adapted to engage the confronting end of extension 301 whereby movement of the connected power member E actuates the two sections in unison in a brake applying direction. An internal annular groove 306 is provided in the inner surface at the end of extension 301 and a complemental annular groove 307 is provided in the exterior surface of the reduced portion 303, said grooves being in registry when the shoulders aforesaid are engaged by the respective confronting ends of the sections 300 and 301. A split locking ring 308 is adapted to engage both of said grooves to lock the sections together for conjoint movement in the opposite direction when the power member E moves toward released position. The stem 121f carries an annular land 309 spaced from the annular shoulder 120. This land slidably fits the bore 105 in air-tight sealed relation and is disposed to overlap the engaging ends of the sections 300, 301 at all times whereby loss of vacuum via bore 105f, cross bore 133, axial bore 132, and counterbore 134 to the atmosphere is prevented. Accordingly, the air chamber 149 is at all times completely sealed off via bore 105f from the vacuum power chamber 33f. A plurality of radial holes 310 are provided through the wall of section 301, said holes being disposed in circular alignment with the lock ring 308, and through which, suitable tools, such as pins, may be inserted into engagement with the outer surface of the ring 308 to collapse the same sufficiently to enable separation of the two sections should disassembly thereof be desired. The depth of the inner groove being equal to the radial thickness of the ring to enable assembly of the two section extensions in telescoped fashion whereby the coaxial piston elements 300 and 108f associated with the hydraulic master cylinder C⁶ may be assembled therein, and the master cylinder subsequently assembled on the power device B⁶ which steps in effecting assembly of the device facilitate installing the piston 300 and seal assembly within the working chamber of the master cylinder.

*Modified by-pass port control and operation*

This modification is depicted in Figure 18 and the arrangement is essentially similar to the Figure 1 embodiment with corresponding parts identified by like reference characters to those previously used distinguished, however, by the addition of the letter "g" to each numeral and the exponent "7" to each letter. The relief or by-pass port 231g is disposed immediately ahead of the lip of the primary cup seal in released position for control thereby which eliminates need for the by-pass port 115. The exterior of the forward portion of the primary piston projecting into the hydraulic cylinder 18g is similar to current commercial construction except that the cross-bores 114g are retained to enable return of leaky liquid to the reservoir. This seepage may result from liquid under high pressure getting past the lip of the secondary piston head cup seal 112g during sustained brake "on" conditions. It will be noted on reference to the figure that the primary piston 40g carries a primary ring-type cup seal 71g on the face of the piston head, an annular external shoulder 63g spaced from the head adjacent to which is mounted in a channel 68g a secondary annular ring-type cup seal 69g, said annular head land forming with the shoulder aforesaid an annular liquid passageway 64g therebetween. A plurality of passageways 83g are disposed in the land and controlled by the conventional washer-type valve 82g, disposed between the primary cup seal and head face of the primary piston. This arrangement also eliminates the one-way blocking pins 124 of Figure 1 embodiment since the secondary or reactive piston 108g no longer seals off the reservoir F⁷ from the pressure working chamber 18g. Thus the primary piston exterior is constructed substantially similar to pistons of conventional hydraulic master cylinders having an open end to enable pedal operation thereof as is understood.

In the preferred operation, assuming the parts in the position shown corresponding to Figure 1, initial depression of the pedal 20 would move the slide valve 128g to open position and simultaneously move the reactive piston 108g to additionally compress the springs 103g and 144g. This action of the pedal against these pre-loaded springs provides the operator with "feel" to prevent "over-braking" prior to the power phase becoming effective, it being understood that spring 144g is preferably of less preloaded strength than the power member return spring 35g, thus enabling relative movement of the slide valve 128g to open position whereupon the power device B⁷ is energized in a manner already described in connection with the operation of previous embodiments, to start the working stroke of the primary piston 40g, the initial movement of which causes the lip of the primary cup seal 71g to cover the by-pass port 231g and thus condition the working chamber for displacement of liquid under pressure therefrom through the discharge port 14 as the primary and secondary pistons are further projected into the hydraulic cylinder by the power device and pedal. The by-pass port remains closed during the full working stroke of the primary piston, but upon release of this piston to the position shown in Figure 18, this port is uncovered to compensate for over-supply of liquid in the system. In this modification, the initial power phase conditions the pressure chamber for operation, while in the disclosures of the present invention previously described, this conditioning operation is effected by the secondary piston 108g covering the by-pass port 115g when initially operated by the pedal 20. Accordingly, the present invention contemplates conditioning the hydraulic master cylinder for operation to displace liquid under pressure by either initial power or operator phase of operation, and in either case, the pressure across the head of the reactive piston supplements the reactive spring 103g to provide the operator with an awareness of the extent of braking force. It is desired to point out that the spring 144g may be eliminated from the structure without impairing its effectiveness but is retained to provide additional selective biasing action in opposition to pedal movement without changing the rate of the standard spring 103g which additionally controls the residual check-valve. However, the spring 144g cannot exceed the preloaded biasing action of the power member return spring 35g as otherwise, the operator would move the power assembly with initial movement of the pedal and possibly load the pedal too heavy and thus sacrifice some of the reduced effort advantageously provided by the present invention.

*Modified power cylinder assembly*

This modified power cylinder construction depicted in Figure 19 is designed to facilitate assembly of the flexible power diaphragm without the necessity of having to anchor its peripheral edge within or on the cylinder casing as by a plurality of securing means such as bolts or rivets customarily used which add to production cost. This modified structure also uses like identifying reference characters to those previously applied to corresponding parts distinguished, however, by the addition of the letter "h" to each numeral and the exponent "8" to each letter. As the illustration clearly demonstrates, the power cylinder comprises two cup-shaped cylindrical casings or members 310 and 311 of the same diameter having their open confronting ends formed with outturned annular flanges 312 and 313, respectively. The fitting 224 is mounted on the rear member 311 similarly to that already described in connection with the Figure 1 embodiment. An annular sleeve 314 is formed with an outer annular channel 315 on the inner end and an annular outturned flange 316 on the outer end. The flanges 312 and 313 on the cup-shaped members and flange 316 on the sleeve are provided with a plurality of registering holes 317 (six for example) in circumferentially equally spaced relation, the sleeve flange being adapted to be clamped between the flanges of the cup-shaped members to provide a unitary assembly.

To assemble this modified power cylinder, the peripheral bead $48h$ on the diaphragm $49h$ is inserted in the sleeve channel following which the sleeve is pressed into the position shown wherein its flange contacts the flange of the forward cup-shaped member. This operation places radial tension on the annular bead of the diaphragm to slightly deform the same to effect an airtight seal with respect to the inner surface of the forward cup-shaped member 310 thus forming the power chamber. The other cup-shaped casing is now placed in position with its flange contacting the opposite side of sleeve flange and the bolt holes aforesaid in registry, thereupon bolts 318 are inserted in the holes and tightened to make the power cylinder into a rigid unitary assembly as is understood. Thus, assembly or dis-assembly of the power cylinder may be readily effected by clamping the diaphragm sleeve between the cup-shaped members or release of the sleeve, respectively. This construction also facilitates alignment of the cylinder members with respect to each other and the hydraulic cylinder mounted on the forward end of one of the members to prevent binding of the hydraulic primary piston 40 in the assembled device $A^8$.

Modified primary cup seal construction

Figure 20 illustrates a modified primary cup seal which eliminates the reactive piston cup seal, otherwise the arrangement is essentially similar to the embodiment disclosed in Figure 18. This modification also employs like identifying reference characters to those previously used for corresponding parts distinguished, however, by the addition of the letter "$i$" to each numeral and the exponent "9" to each letter.

As this illustration clearly shows, the primary cup seal 320 is formed with a forwardly extending substantially semi-spherical hollow embossment 321 forming a closed dome-end disposed coaxially with respect to the reactive plunger $108i$, the latter having a forward complemental dome-end 322 projecting into the hollow in contact with the inner surface of the seal dome, with the device $A^9$ in released position as portrayed in this figure, this condition obtaining throughout the full operating stroke of the device. The vertical web 323 of the cup seal which connects the annular peripheral lip portion 324 which includes the flutes $72i$, with the hollow embossment, is adapted to engage the end face of the piston head $62i$ and the customary washer-type valve $82i$ is disposed between the peripheral marginal portion of the web and the piston face to control the passageways $83i$ in the manner already described. A substantially ring type spring seat 325 having forwardly projecting inner and outer annular legs or flanges 326 and 327 respectively, and interconnected by a vertical web 328, the latter being adapted to bear against the vertical web 323 of the cup and the inner flange 326 which is formed with the same contour as the outer surface of the hollow embossment 321 to continuously engage this surface, includes a central opening 329 to prevent trapping of liquid between the spring seat and cup 320 whereby the spring $103i$ normally reacts on the tubular member $40i$ and reactive plunger $108i$ in a brake-releasing direction, thus providing means for maintaining the cup seal in contact with the piston face during the working stroke thereof and for returning the reactive plunger $108i$ and primary piston $40i$ to their respective released positions. The portion of the tubular member $40i$ is modified to include a reduced diameter bore 330 substantially in circular alignment with the head land $62i$ and through which the dome-end of the reactive plunger $108i$ projects into contact with the embossment on the cup 320. This reduced diameter bore forms an internal shoulder 331 with the bore $105i$ and which is longitudinally spaced forwardly from an annular land 332 formed on the plunger $108i$ to provide an annular liquid space 333 therebetween, said land having a working fit with respect to the bore $105i$ and carries an annular pliant sealing ring $117i$ in an annular channel $118i$ formed medially therein. In the event of seepage past the head of the reactive plunger $108i$, such is returned to the reservoir via the cross bores $114i$ which interconnect the annular liquid spaces $64i$ and 333 with the former connected to the reservoir $F^9$ via the intake port $66i$. The resilient characteristic of the cup seal enables the reactive plunger $108i$ to move relatively to the primary piston $40i$ and therefore receive reaction from spring $103i$, and in so doing slightly elongates the embossment causing the web of the spring seat to disengage from the cup wall 323, while the elasticity of the cup seal embossment combined with the reaction of spring $103i$ on seat 325 tend to push the reactive plunger $108i$ in opposition to pedal movement thereof. This latter action plus spring $144i$ provides the operator with an awareness of the effective braking force supplementally to the pressure acting across the end of the embossment of the cup seal engaging the dome-head of the reactive plunger. Accordingly, the spring $103i$ is no longer directly effective on the pedal via the reactive plunger $108i$ and slide valve 128 due to the spring seat 325 acting through the resilient dome 321 and wall 323 of the cup 320 rather than, as in the first embodiment Figures 1 and 2 or the modification shown in Figure 12 where the spring seat 87 or $87g$ respectively, mechanically engages the head of the reactive piston 108 or $108g$ via the stem portion 86 or $86g$ integral with said seat. The tension set up in the embossment due to its pliancy, is less than the pressure exerted by the spring $103i$ on the cup seal, thus maintaining the cup seal in proper operating position against the piston head face at all positions of its working stroke.

In operation, this modified cup seal devoid of a central opening as in the case of the Figure 1 embodiment, completely and effectively seals off the primary piston $40i$ and reactive piston or plunger $108i$ from the pressure working chamber $18i$ without sacrificing hydraulic and spring thrust reaction on the plunger $108i$ for transmission to the pedal $20i$ via the slide valve 128 during brake applying operations. Installation of this type of cup seal is quite simple requiring no special mounting parts therefor and readily accommodates use of standard washer or reed-type valves for controlling the passageways $83i$. It will be noted that the spring $103i$ is now disposed between the residual check-valve $G^9$ and primary piston $40i$ as is the conventional practice with the spring seat 325 normally reacting simultaneously on the reactive plunger $108i$ and pressure-transmitting member $40i$. It should be importantly noted in connection with the central opening 329 of the spring seat 325, that this opening may be varied to provide new and novel reacting effects of the spring $103i$ where the pedal $20i$ mechanically acts directly on the reactive plunger or piston $108i$. That is to say, with the opening as illustrated in this figure, the circular marginal portion thereof engages sufficient surface of the cup embossment 321 to continuously transmit the reaction of spring $103i$ via the resilient wall of said embossment to the dome-head of the plunger $108i$ and at the same time during brake-releasing operations of the pedal, the vertical resilient wall 323 of the cup is engaged by the corresponding portion of the spring seat to enable the spring 103i to urge the tubular pressure-transmitting member 40i toward its released position as shown in the figure. Thus, in this case, the hydraulic thrust across the dome embossment 321 combines with the force of the spring 103i to provide substantially the total reaction on the end of the plunger 108i which in turn is transmitted directly to the pedal 20i, while if this opening 329 is enlarged to a diameter substantially equal to or greater than the diameter of the reactive plunger 108i, then the reaction of spring 103i on the plunger head 322 would be nullified reducing the reaction on the pedal 20i to that provided solely by hydraulic thrust on the plunger head plus the reaction of the thrust-transmitting spring 144i, the latter spring reaction also combines with the hydraulic and spring thrust reaction first mentioned to provide the total effective reaction on the pedal when operated in a brake-applying direction. Accordingly, this important modification of the present invention, provides commercially desirable means of reaction control on the operator-operated pedal 20i whereby the reactive spring 103i is coaxially disposed within the working chamber 18i of the master hydraulic cylinder C⁹ for supplementing or acting independently of proportional hydraulic thrust on the reactive plunger 108i in a brake-applying direction with the reaction of said spring nullified on the tubular member 40i to prevent power loss in overcoming the biasing effect of this spring; but when the reacting function of this spring on the plunger 108 is dispensed with in the manner described above by enlarging the opening 329, then the spring 103i acts as a return spring only on the tubular member 40i requiring the power member E⁹ to overcome this spring at all operating positions thereof with added pedal load should power failure occur to operate the brakes directly by the pedal as is understood.

*Operational summary*

From the foregoing description, taken in connection with the various illustrations of the different embodiments of my invention, it will be seen that certain interrelated components of the liquid pressure-producing mechanism A possess similar functional characteristics such that interchangeability is readily effected, particularly in connection with the power controlling features and type of pressure-transmitting member 40 employed in the master cylinder working chamber 18 which may take the form of a piston having the same cross-sectional area as the chamber, or a plunger of less cross-sectional area than the chamber which, in the latter case, would eliminate machining the interior of the chamber but a longer working stroke would be required. For example, the flexible power diaphragm 49 and the piston-type power member E² may be controlled with substantially equal efficiency by either of slide valve elements 128 or 128a, whether power cylinder B or B¹ is employed. Either of the power cylinders B or B¹ is adaptable for actuation by either compressed air or vacuum, and the pedal control of these cylinders may be had with the illustrated pendulum-type pedal 20 or other types such as those commonly on the floorboard of the driver's compartment. Spring 103 may be made of such strength that it alone can return the movable power assembly E to released position thus eliminating return spring 35, particularly in the case where the power member is fixed to the hydraulic piston or plunger as exemplified in Figure 16. While, in Figure 17 the hydraulic piston or plunger member is the composite type comprising two sections releasably attached together for conjoint movement to facilitate assembly of the hydraulic master cylinder C on the power mechanism B. Also the ring compensating valve 82 may be substituted for the modified star-shaped valve 260 of Figures 13 and 14, and the compensating port 115 controlled in conjunction with the head seal on the reactive piston or plunger 108 by either the modified passageway system of Figure 15 or the one-way blocking pins 124, to condition the hydraulic master cylinder for operation.

Moreover, several novel combinations are optionally provided by the interchangeability of the different hydraulic cylinder constructions herein disclosed which may be actuated by either the illustrated flexible power diaphragm or power piston whether these power members are detachable from or rigidly secured to the primary hydraulic piston, the latter being preferably formed of a single tubular member, or in two sections coupled together to facilitate assembly of the section operably projecting into the hydraulic cylinder while any of the illustrated variations of the pedal-controlled secondary piston or plunger coaxially disposed within the hollow of the tubular member may be readily associated with any of the illustrated variations in the primary piston or plunger. Accordingly, a wide range of power-assisted liquid pressure producing devices A are made available by the present invention in several different designs to suit individual installation requirements, that is, whether the unit is for operating the brakes of a pleasure car, truck or bus.

Accordingly, the aforesaid components of the present construction afford different commercially desirable results by providing selective novel combinations of braking control according to the installation desired for the particular type of motor vehicle, that is, whether a commercial or passenger car. Further beneficial results in the braking control of a motor vehicle equipped with my power brake system may be realized in the selective use of the flexible power diaphragm and piston-type power member since either of these power assemblies is adapted to not interfere with normal operator-operation of the hydraulic master cylinder in the event of complete disablement of the power or its inadequacy to provide the necessary stopping force.

It is important to point out that the relative strength of spring 144 in preloaded condition must have a thrust-transmitting capacity of greater magnitude than the combined reaction from spring 103 and the locking effect of the releasable connecting means 169—175 between the primary piston and power member shown in Figures 18 and 20, plus the reaction from the power assembly return spring 35 where the power member and primary piston form a unitary assembly as demonstrated in Figure 16, determines whether the primary piston is initially operated to close the compensating port 231 responsive to initial pedal or power movement thereof. For example, with the engine running, if valve spring 144 in preloaded status is of less strength than the combined reaction from spring 103 as installed and the locking effect of the releasable connecting means which latter in effect is less than the preloaded weight of the power member return spring 35, then the slide valve 128 and reactive piston 108 would move simultaneously relatively to the primary piston to control operative energization of the power member to close the compensating port 231 responsive to initial pedal movement. However, if the preloaded weight of spring 144 is more than the aforesaid preloaded status of spring 103 and the locking effect of the releasable connecting means 169—175, or in the case of the power member E being secured to the primary piston for movement therewith greater than the return spring 35, then initial pedal movement in a brake-applying direction would move the primary piston simultaneously with the secondary piston 108 and slide valve 128 to close the compensating port 231 prior to operative energization of the power member E. This latter condition obtains until the pressure in the working chamber 18 of the hydraulic master cylinder C offers sufficient resistance to overcome spring 144 and thus holds the primary piston from moving forwardly with the secondary piston and slide valve, whereupon the reactive piston 108 and slide valve 128 will move relatively with respect to the tubular piston 40 to operate the valve 128 into a position (see position of valve land 129 in Figure 9) wherein the vacuum in the engine intake-manifold is connected with the power chamber 33 of the device A. This will cause the power member E to move forwardly and apply pressure to the tubular piston in accordance with pedal movement with corresponding pressure on the liquid in the hydraulic working chamber causing the liquid to be displaced through the discharge port into the wheel cylinders to apply the brakes in a well known manner. As will be appreciated, such increase in pressure reacts on the head of the reactive piston 108 exposed to pressure conditions in said working chamber 18, thence on the slide valve to the pedal to provide the operator with a reactive force proportionate to the total displacement of both pistons 108, 40.

If, however, the engine is not running, the preloaded weight of spring 144 in relation to spring 103 and the locking effect of the releasable connecting means 169—175 opposed by return spring 35, above described, effects only slight change in the effectiveness of initial braking force, since with no power available, the operator must actuate both pistons solely by physical force to apply the brakes, and before the working chamber 18 is conditioned to discharge liquid pressure into the hydraulic system, the compensating port 231 must be closed. If the weight of spring 144 is less than the locking effect or return spring action aforesaid, the end of the extension 137 on the slide valve would be brought into engagement with its complemental shoulder or thrust washer 140 on the interior of the tubular piston and thus move the piston directly by the pedal, but if the weight of spring 144 is greater than the opposing forces aforesaid this spring in preloaded status would move the primary piston simultaneously with pedal movement to slightly advance initial brake application over that provided by the former arrangement. Thus, it is seen that spring 144 may be selectively rated to operate solely as a valve return spring or to include a "thrust-transmitting" characteristic between the pedal and primary piston, and by the mere changing of the rate of spring, an entirely different operating sequence is provided to apply the brakes. The present invention, therefore, contemplates use of selectively weighted springs 144 to gain the aforementioned novel brake applying operations provided by the modified structures exemplified in Figures 18 and 20.

An important feature of braking control results from the use of spring 144 as a thrust-transmitting means between the pedal and primary piston, such that in the event the brakes are applied initially by a sudden thrust of the pedal, this spring blocks the power-boost application until it can be brought into assist pedal operation smoothly and without abrupt shock. This smooth mergence of the power phase with the pedal operation after the latter has inaugurated pressure build-up in the master cylinder, avoids power-boost lock of the vehicle wheels with resultant tendency of throwing the car occupants forwardly out of their seats, and sometimes leads to loss of control or a potentially dangerous skid. Thus, the present invention retains all of the functions of a standard master cylinder as well as having this important built-in automatic control to offset the usual effects of too-rapid depressing of the brake pedal whereby the advantages of fully controlled, predictable response are provided for complete braking safety.

Considering the terminology used in the foregoing description and in the appended claims, the identifying expressions and/or terms employed are intended to convey meanings which include the range of reasonable equivalents in the patent sense. For example; the expressions "servomotor," "power cylinder," "power device," "power means," "power mechanism" are intended to include any casing and/or chamber having a pressure-responsive movable assembly therein, whether such assembly includes a piston, or a flexible diaphragm, or some other member serving the same purpose. The terms "front," "rear," "right," "left," and other directional words or characters are intended to have only relative connotation for convenience in describing the structure as illustrated, and are not intended to be interpreted as requiring any particular orientation with respect to associated structure external to the present disclosure.

Although it will be apparent that the preferred embodiments of the invention herein disclosed are well calculated to fulfill the objects above stated, it will be appreciated that I do not wish such to be limited to the exact construction and/or arrangement of parts shown, since it is evident that modifications, variations, changes, and substitutions may be made therein without departing from the proper scope or fair meaning of the subjoined claims.

Having thus described my invention, I claim:

1. In a brake booster system for fluid column operated brakes: a master cylinder having a fluid reservoir, fluid-displacing means including an axially bored plunger advanceable in such master cylinder from a normal released position to compress such column of fluid to a brake-applying pressure, a pressure differential actuated booster motor comprising a two-compartment power cylinder defined by a power member movable therein to vary said compartments in which pressures are balanced when said power member is normally in released position, a source of pressure different from atmosphere to produce said pressure differences in said compartments to move said power member, an axially bored working member coaxially engaging said plunger to advance it when acted on by said power member, an operator-operated member having a normally released position, control valve means including a movable element associated with said power member for controlling said source to cause power-activation of said motor in response to operating said operator member from released position, said valve element having a normal "off" position wherein said motor is inactivated, the improvement which comprises a pair of ports through the wall of said working member and normally providing communication from the interior of said working member to said power chamber and said source respectively, said valve element being effective to selectively control the port leading to said power chamber whereby pressure therein is varied to create differential pressures on opposite sides of said power member; a normally preloaded compression spring operably disposed in the bore of said working member for resetting said valve element to its "off" position; fluid passageway means including a normally open port through the wall of said plunger, incorporated between said master cylinder and reservoir, for controlling fluid communication therebetween; an extension coaxially engageable with said valve element for conjoint movement and projecting through the bores in said working member and plunger where the free end thereof is exposed to hydraulic reaction from the pressurized fluid in said master cylinder; means on the free end of said extension for closing said port to interrupt fluid communication between said master cylinder and reservoir in response to initial relative movement of said valve element and extension in a power-activating and fluid pressurizing direction with respect to said plunger in released position; one-way interlocking means operably incorporated between said master cylinder and extension aforesaid for maintaining the latter disengaged from said valve element, in its port closing position while said motor is activated from its released position under control of said control valve means; a normally preloaded spring operably disposed in said master cylinder for resetting said plunger to its released position and said extension to its relative released position with respect to said plunger to open the port in the latter whereby fluid communication is re-established between said master cylinder and reservoir upon said interlocking means releasing said extension; force-transmitting means operably incorporated between said power and working members to connect them for movement together while said power member is activated under control of said control valve means; normally spaced complemental abutting means operably incorporated between said operator member and plunger for establishing the relative working movement of said valve element and extension with respect to said plunger, said abutting means being effective when said operating movement is taken up to apply physical operating force directly to said plunger from said operator member; and another normally preloaded spring operably disposed in one of said compartments with its opposite ends reacting between said power cylinder and said power member respectively to establish the latter in its normally released position in unison with or independently of said working member.

2. A brake booster system according to claim 1 in which said fluid-displacing means comprise: a port leading from said reservoir, and a fluid chamber interconnecting said reservoir port and the port in said plunger whereby fluid communication is normally effective between said reservoir and master cylinder when the said power member is in normally released position.

3. A brake booster system according to claim 1 in which said one-way interlocking means comprise: an internal annular groove on said master cylinder defined by a pair of spaced angular working surfaces; a complemental external working surface on said extension radially spaced inwardly from said pair of working surfaces in normal circular alignment with one of said pair of working surfaces; a radially movable element carried by said plunger in normal interposed engaging relation with respect to said pair of working surfaces and normally out of engagement with said complemental working surface, said element being movable inwardly radially under influence of one of said pair of working surfaces into engagement with said complemental working surface to block return movement of said extension to maintain the port controlled thereby closed, in response to initial relative movements of said extension and plunger in that order from their respective normal positions.

4. A brake booster system according to claim 1 in which the force-transmitting means comprise: a sleeve member fixed to the power member through which a portion of the working member projects; a threaded bore through the wall of the sleeve member, a threaded plug for closing the outer end of said bore, an element movable in said bore, a third normally preloaded compression spring reacting between the plug and element, and a depression in the outer face of the working member for reception of said movable element under influence of its spring aforesaid to releasably connect the sleeve and working members for unison movement in a brake-applying and releasing direction.

5. A brake booster system according to claim 1 in which the said force-transmitting means comprise: an element fixed on said working member, and a complemental element fixed on said power member for establishing a one-way connection therebetween when said elements are engaged, whereby said power and working members are movable together in a brake-applying direction only.

6. A brake booster system according to claim 1 in which the said force-transmitting means comprise: an element interconnecting said power and working members for movement together.

7. A brake booster system according to claim 1 including a cavity open at one end and closed at the other in said power member and encircling an intermediate portion of said working member, said closed end terminating in a reduced diameter cavity to provide an annular valve seat at the point of mergence between said cavities; an element fixed on said working member and normally disposed within said first-mentioned cavity in air-tight engaging relation with respect to said valve seat, said reduced cavity having continuous communication with the port in the working member leading to said power chamber; a longitudinal air-vacuum passageway through said last-mentioned element interconnecting said reduced cavity and power chamber; a longitudinal air-vacuum passageway in said power member, one end of which terminates flush with said valve seat for closure thereby and the other end intersects the other port in said working member whereby said last-mentioned element is separated from its cooperating valve seat by physical operating force applied to said operator member upon failure of power assistance, the last mentioned longitudinal air-vacuum passageway being placed in communication with the said power chamber to activate the power member irrespective of the separated status of said element from its valve seat to restore normally engaging relation therebetween when power-activation becomes effective.

8. A hydraulic pressure-producing mechanism, in which physical operating force is supplemented by power assistance, including: a master cylinder having a liquid reservoir, an axially bored liquid-displacing member operably projecting from a normal released position into said master cylinder to pressurize the liquid therein, a power device provided with a casing, a fluid pressure responsive wall reciprocably mounted in said casing and activatable from a normally released position to operate said displacing member; control valve means having a movable element disposed in the bore of said displacing member, said valve element having a normally released position wherein the power device is inactivated and an operating position wherein said power device is activated, a reactive member movably disposed in the bore in said displacing member in coaxially engaging disposition with respect to said valve element for movement together with the free end of said reactive member exposed to hydraulic reaction from the pressurized liquid in said master cylinder, liquid passageway means including a normally open port through the wall of said displacing member, incorporated between said master cylinder and reservoir, for controlling liquid communication therebetween; means on the free end of said reactive member for closing said port to interrupt liquid communication between said master cylinder and reservoir in response to initial relative movement of said reactive member in a liquid pressurizing direction with respect to the displacing member in released position, a normally preloaded spring operably disposed in the bore of said displacing member and adapted to bias said valve element toward its normal power-inactivating position of control, the improvement which comprises: releasable force-transmitting means operably incorporated between said wall and displacing member to connect them for movement together while said wall is activated under control of said control valve means; a source of power force connectible to the interior of said casing to one side of said wall to cause movement of said wall in response to movement of said control valve means to operating position; and an operator-operated member having a normally released position for effecting relative movement of said valve element against the bias of said valve return spring, and for effecting release of said force-transmitting means to disconnect said displacing member from said wall when the latter is inactivated, in response to applying physical operating force on said displacing member in a liquid pressurizing direction.

9. A hydraulic pressure-producing mechanism according to claim 8 including one-way interlocking means operably incorporated between the master cylinder and reactive member for maintaining the latter in its port closing position while said wall is activated from its released position under control of said control valve means; and a normally preloaded spring operably disposed in said master cylinder for resetting said reactive member to its released position relatively to said liquid-displacing member to open the port in the later whereby fluid communication is re-established between said master cylinder and reservoir upon said interlocking means releasing said reactive member.

10. A brake booster system according to claim 8 in which said liquid passageway means additionally includes an intake port between said master cylinder and reservoir, a liquid passage in said displacing member leading from said port therein, and normally communicating with said intake port when said wall, displacing and reactive members are in their respective released positions to establish communication between said master cylinder and reservoir via said passageway means, said intake port being cut-off from said passage by initial movement of said plunger whereby communication between said master cylinder and reservoir is interrupted notwithstanding said reactive member is operable to open and close said port in said displacing member as a function of moving said valve element to control said wall.

References Cited in the file of this patent

UNITED STATES PATENTS

| | | |
|---|---|---|
| 1,960,996 | Guernsey | May 29, 1934 |
| 2,006,487 | Sorensen | July 2, 1935 |
| 2,165,942 | Rossmann | July 11, 1935 |
| 2,229,247 | Kamenarovic | Jan. 21, 1941 |
| 2,241,374 | Alfieri | May 13, 1941 |
| 2,260,491 | Stelzer | Oct. 28, 1941 |
| 2,395,223 | Ingres | Feb. 19, 1946 |
| 2,458,803 | Stelzer | Jan. 11, 1949 |
| 2,463,062 | Seppmann | Mar. 1, 1949 |
| 2,526,457 | Bradbury | Oct. 17, 1950 |
| 2,532,960 | Stelzer | Dec. 5, 1950 |
| 2,685,172 | Price | Aug. 3, 1954 |
| 2,690,740 | Hupp | Oct. 5, 1954 |
| 2,752,892 | Banker | July 3, 1956 |
| 2,770,949 | Randol | Nov. 20, 1956 |
| 2,826,042 | Rike et al. | Mar. 11, 1958 |
| 2,852,921 | Ayers | Sept. 23, 1958 |

FOREIGN PATENTS

| | | |
|---|---|---|
| 747,273 | France | Mar. 28, 1933 |

UNITED STATES PATENT OFFICE
CERTIFICATION OF CORRECTION

Patent No. 2,959,011                  November 8, 1960

Glenn T. Randol

It is hereby certified that error appears in the above numbered patent requiring correction and that the said Letters Patent should read as corrected below.

Column 5, line 1, for "5-5" read -- 6-6 --; line 57, for "preferbly" read -- preferably --; same column 5, line 75, after "vehicle" insert -- , and --; column 7, line 30, for "ring cup" read -- single lip --; line 34, for "service" read -- surface --; column 8, line 11, strike out "ring cup"; line 28, strike out "ring"; same column 8, line 38, for "end" read -- and --; column 9, line 73, for "sleeve" read -- sleeves --; same line 73, for "is" read -- are --; line 75, after "157" insert -- respectively --; column 10, line 5, strike out "ring"; line 13, for "connect" read -- connects --; same column 10, line 38, for "counterbore" read -- counterbores --; column 11, line 25, strike out "ring"; column 18, line 5, for "that" read -- than --; column 19, line 9, for '"E$^1$"' read -- E$^1$ --; line 37, for "type-wave" read -- wave-type --; column 20, line 24, for "desrcibed" read -- described --; line 25, for "184" read -- 284 --; same column 20, line 51, for "exponent 5 to" read -- exponent "5" to --; column 21, line 64, for "leaky" read -- leakby --; line 73, strike out "ring-type"; column 22, line 1, for "are" read -- is --; line 13, for "position" read -- positions --; column 24, line 5, after "The" insert -- forward end --; line 16, for "sealing ring" read -- seal --; same column 24, line 61, for "G9" read -- G$^9$ --; column 27, line 53, for "into" read -- in to --; column 28, line 40, after "comprises" insert a colon; line 69, for "a" read -- another --; column 29, line 49, for "third" read -- fourth --.

Signed and sealed this 30th day of January 1962.

(SEAL)
Attest:

ERNEST W. SWIDER
Attesting Officer

DAVID L. LADD
Commissioner of Patents